United States Patent [19]
Nishino et al.

[11] Patent Number: 5,878,360
[45] Date of Patent: *Mar. 2, 1999

[54] ELECTRIC POWER STEERING CONTROL APPARATUS

[75] Inventors: Kazuhisa Nishino; Yuji Takatsuka; Shunichi Wada, all of Himeji, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 474,653

[22] Filed: Jun. 7, 1995

[30] Foreign Application Priority Data

Jun. 9, 1994 [JP] Japan .................................. 6-127742

[51] Int. Cl.$^6$ .................................................. B62D 5/04
[52] U.S. Cl. ........................... 701/41; 180/443; 180/446; 180/412
[58] Field of Search ...................... 364/44.051, 424.052; 180/6.28, 443, 446, 412, 413, 415, 421, 422, 423, 444; 701/41, 42

[56] References Cited

U.S. PATENT DOCUMENTS

| | | | |
|---|---|---|---|
| 4,666,011 | 5/1987 | Ohe et al. ............................... | 180/446 |
| 4,687,976 | 8/1987 | Shimizu ................................. | 180/6.28 |
| 4,688,655 | 8/1987 | Shimizu ................................. | 180/446 |
| 4,727,950 | 3/1988 | Shimizu et al. ........................ | 180/446 |
| 4,825,972 | 5/1989 | Shimizu ................................. | 180/444 |
| 4,837,692 | 6/1989 | Shimizu ............................ | 364/424.051 |
| 4,909,343 | 3/1990 | Mouri et al. ............................. | 180/422 |
| 5,076,381 | 12/1991 | Daido et al. ...................... | 354/424.051 |
| 5,097,918 | 3/1992 | Daido et al. ...................... | 364/424.051 |
| 5,460,235 | 10/1995 | Shimizu ................................. | 180/446 |

FOREIGN PATENT DOCUMENTS

| | | |
|---|---|---|
| 0350817 | 1/1990 | European Pat. Off. . |
| 0566168 | 10/1993 | European Pat. Off. . |
| 4-19270 | 1/1992 | Japan . |
| 2188890 | 10/1987 | United Kingdom . |

*Primary Examiner*—Gary Chin
*Attorney, Agent, or Firm*—Sughrue, Mion, Zinn, Macpeak & Seas, PLLC

[57] ABSTRACT

An electric power steering control apparatus is intended to improve the convergence and control stability of a returning motion of a steering wheel when a driver of a vehicle on which the apparatus is installed lets his or her hands free from the steering wheel, and to reduce a burden to the driver when an excessive steering torque occurs during the returning motion. The apparatus includes a steering torque sensor 8 for detecting a steering torque of a steering system of the vehicle, a motor rotational-speed detector 7 for detecting a rotational speed of the electric motor, and a rotational-speed controller for controlling the electric motor based on output signals from the steering torque sensor and the motor rotational-speed sensor so that when the steering torque as detected is less than a predetermined torque value, the rotational speed of the electric motor does not exceed a predetermined speed value corresponding to the predetermined torque value.

4 Claims, 19 Drawing Sheets

ELECTRIC POWER STEERING CONTROL APPARATUS

BACKGROUND OF THE INVENTION

1. Field of the Invention

The present invention relates to an electric power steering control apparatus for a vehicle such as a motor vehicle which is able to improve the convergence and control stability of a steering wheel during returning motion thereof with no steering load or torque being applied to the steering wheel by a driver or operator of the vehicle (i.e., hand free operation), as well as to reduce a burden to the driver when an excessive returning torque is applied to the steering wheel.

2. Description of the Related Art

FIG. 34 is a schematic view showing a conventional electric power steering control apparatus disclosed, for example, in Japanese Patent Laid-Open No. HEI 4-19270, and FIG. 35 is a circuit diagram showing a control unit of the apparatus. In FIG. 34, a steering wheel 201 is connected to a steering column 202 having a sensor 203 mounted thereon. The sensor 203 is connected to an electric power steering control circuit 204 which generates an output signal based on the signal from the sensor 203 for driving an electric motor 1. When the electric motor 1 is energized to generate driving power, an output shaft 205 of the motor 1 is driven to rotate the steering shaft 202 so that a pinion 206 attached to the steering column 202 is thereby rotated to movie a rack 207 to the right or left, i.e., in the lateral directions. The movement of the rack 207 causes front wheels 208 of the vehicle to be steered or turned to the right or left.

In FIG. 35, first to fourth field effect transistors (FETs) 21 to 24 cooperate with the electric motor 1 to constitute a bridge circuit and are connected to a logic control unit 25. The logic control unit 25 is connected to a central processing unit (CPU) 26. The logic control unit 25 includes a pair of AND circuits 25a, 25b and amplifiers 25c to 25g. The amplifiers 25c, 25e, 25f and 25g are connected to the first, the second, the fourth and the third FETs 21, 22, 24 and 23, respectively. The CPU 26 outputs a PWM signal S1, a forward rotation signal S2 to rotate the electric motor 1 in the forward direction and a reverse rotation signal S3 to rotate the electric motor 1 in the reverse direction. The first AND circuit 25a turns on the first FET 21 when the PWM signal S1 and the forward rotation signal S2 are input thereto from the CPU 26 at the same time. The second AND circuit 25b turns on the second FET 22 when the PWM signal S1 and the reverse rotation signal S3 are input thereto from the CPU 26 at the same time.

Also, if the forward rotation signal S2 is output from the CPU 26, the fourth FET 24 will normally be turned on. Likewise, if the reverse rotation signal S3 is output from the CPU 26, the third FET 23 will normally be turned on. Further a first current detector 27 for detecting a current during the forward rotation of the electric motor 1, a second current detector 28 for detecting a current during the reverse rotation of the motor 1, an amplifier 29 connected to a torque sensor 30, and a waveform shaping circuit 31 connected to a speed sensor 32 are connected to the CPU 26.

Next the operation of the above-mentioned conventional power steering control apparatus will be described. If the steering wheel 201 is operated by the driver, the torque sensor 30 and the speed sensor 32 sense a steering torque and a vehicle speed, respectively, and generate a corresponding torque signal and a corresponding speed signal at that time which are input to the CPU 26. Upon receipt of these signals, the CPU 26 calculates a command value for rotating the motor 1 based on the respective signals, and at the same time, the feedback current of the bridge circuit detected by the first current detector 27 is input to the CPU 26. Then, the CPU 26 calculates a PWM value based on a difference between the command value and the feedback current value and generates a corresponding output signal. Here, it is to be noted that the torque sensor 30 outputs a plus or positive signal when the steering wheel 201 is rotated in the forward direction and a minus or negative signal when the steering wheel 201 is rotated in the reverse direction.

If the steering wheel 201 is rotated in the forward direction, the command value will be plus and the PWM value will also be plus, so a duty ratio of the PWM signal can be determined. If the duty ratio of the PWM signal is determined, the PWM signal S1 and the forward rotation signal S2 for driving the electric motor 1 will be output from the CPU 26. In response to the PWM signal S1 and the forward rotation signal S2, the first AND circuit 25a of the logic control unit 25 is operated to generate a high-level signal so that the first FET 21 is thereby turned on under the PWM control. Also, in response to the forward rotation signal S2, the fourth FET 24 is turned on. If the first and fourth FETs 21 and 24 are operated or made conductive, a current will flow in a direction from the first FET 21 to fourth FET 24 via the electric motor 1. As a result, the electric motor 1 can be rotated in the forward direction.

If, in the above described state, the driver releases his or her hands from the steering wheel 201, the steering wheel 201 will be rotated in the reverse direction under the action of the caster angle of the front wheels, and the electric motor 1 will be rotated in the reverse direction, so the PWM value will become minus. If the PWM value is minus, it is determined whether the speed of the vehicle at that time is in a low or a high speed region. If the speed of the vehicle is in the low speed region, a duty ratio is then set such that a regenerative current is canceled out, and if the vehicle speed is in the high speed region, the duty ratio will be set to zero. If the duty ratio becomes zero, the first FET 21 will substantially be in its off (non-conductive) state. As a result, a regenerative current flows in a short circuit connecting the third FET 23, the electric motor 1 and the fourth FET 24, so that a regenerative braking force acts on the electric motor 1, thus restricting the returning speed of the steering wheel.

As described above, in the conventional electric power steering control apparatus, the direction of flow of the motor current when the steering wheel is in the returning state is detected and the FETs are controlled according to the result of detection, but in order to detect the motor current direction, there is a need for directly detecting a current flowing through a motor line (i.e., wiring connected to the motor 1) or providing a current detection circuit for detecting a motor current at a location within the motor control H bridge circuit at which the regenerative current can be detected. As a result, there have been problems in that the entire circuitry is complicated and the production cost is increased.

Since the braking force acting against the returning motion of the steering wheel is small, the returning speed of the steering wheel cannot be sufficiently suppressed particularly when the steering wheel is forced to return by an excessive reaction force. Therefore, when the steering wheel is returned at high speeds under the action of an excessive steering wheel return torque, there is the drawback that a burden to the driver is increased.

When the steering wheel is returned by a relatively limited reaction force during low-speed traveling or when the steering angle is large, a braking force develops which restrains the steering wheel return speed so that the driver has to return the steering wheel to the neutral position when the steering wheel is desired to be returned quickly to the, neutral position or it is desired to be returned quickly from the steered state to the straight travel state. As a result, there has been another problem in that the driver is excessively burdened.

SUMMARY OF THE INVENTION

The present invention has been made to obviate the problems as described above. Accordingly, an object of the present invention is to provide an electric power steering control apparatus which is inexpensive and capable of reducing a burden on the driver of a vehicle particularly when a steering wheel is returned by an excessive reaction force, as well as improving the convergence and control stability of the steering wheel without reducing the steering wheel return during low-speed traveling or without losing the quickness in the returning motion of the steering wheel after it is steered over a large steering angle.

According to one aspect of the present invention, there is provided an electric power steering control apparatus comprising:

- a steering torque sensor for, detecting a steering torque of a steering system of a vehicle and generating a corresponding output signal;
- an electric motor for generating a power assisting force to reduce a steering force of a driver of the vehicle required to be imparted to the steering system,
- motor drive means for driving the electric motor in a direction of reducing the driver's steering force according to at least the output signal of the steering torque sensor;
- motor rotational-speed detection means for detecting a rotational speed of the electric motor and generating a corresponding output signal; and
- rotational-speed control means for controlling the electric motor based on the output signal of the motor rotational-speed sensor so that when the steering torque is less than a predetermined torque value, the rotational speed of the electric motor does not exceed a predetermined speed value corresponding to the predetermined torque value.

According to the above-described structure, when the driver lets his or her hands free from the steering wheel to allow the steering wheel to return to the neutral position thereof, the steering wheel return speed can be restrained by restraining the rotational speed of the motor. Also, overshooting during returning of the steering wheel after the steering wheel having been steered to the right or left from, the neutral position can be made smaller. As a result the convergence and control stability of the steering wheel can be improved. In addition, when an excessive reaction force occurs, shock to the steering wheel is restrained and therefore a burden to the driver can be reduced.

In accordance with another aspect of this invention, there is provided an electric power steering control apparatus comprising:

- steering torque sensor for detecting a steering torque of a steering system of a vehicle and generating a corresponding output signal;
- an electric motor for generating a power assisting force to reduce a steering force of a driver of the vehicle required to be imparted to the steering system;
- motor drive means for driving the electric motor in a direction of reducing the steering force according to at least the output signal of the steering torque sensor;
- motor rotational-speed detection means for detecting a rotational speed of the electric motor and generating a corresponding output signal;
- motor rotational-direction detection means for detecting a direction of rotation of the electric motor; and
- drive-quantity control means for determining a quantity of drive of the electric motor from at least one of the speed, the rotational speed and the steering angle, the drive-quantity control means being operable to drive the electric motor in a direction opposite to the direction of rotation thereof detected by the motor rotational-direction detection means by the quantity of drive when the steering torque is less than a predetermined value.

According to the above scribed structure, when the driver makes his or her hands free from the steering wheel to thereby allow the steering wheel to automatically return to the neutral position thereof once the steering wheel has been steered to the right or left, the returning speed of the steering wheel can be restrained by restraining the rotational speed of the motor. Also, overshooting during returning of the steering wheel with the driver's hands-free steering can be made smaller. As a result, the convergence and control stability of the steering wheel can be improved. In addition, when an excessive reaction force occurs, shock to the steering wheel is restrained and therefore a burden to the driver can be reduced.

Also, if the quantity of drive of the motor for restraining the rotation of the motor is changed according to the speed of the vehicle, the restraining force can be made greater during high-speed travel in which a reaction force from the road becomes greater, and the restraining force can be made smaller during low-speed travel in which a reaction force from the road becomes smaller and the steering wheel becomes difficult to return. As a result, the convergence and control stability of the steering wheel during high-speed travel can be improved without reducing the steering wheel return speed during low-speed travel. With this, even when the steering wheel is desired to be returned to the neutral position during low-speed travel, there is substantially no need for the driver to positively return the steering wheel to the neutral position, so a burden to the driver can be reduced.

Furthermore, if the quantity of drive of the motor is changed according to the rotational speed of the motor, hunting can be eliminated. Also, if the quantity of drive of the motor is changed according to the steering angle, when the driver lets his or her hands away from the steering wheel with a great angle of steering, the quantity of drive of the motor is reduced, thus rendering the steering wheel return speed faster, and when the steering wheel is near the neutral position thereof and the steering angle becomes limited, the quantity of drive of the motor is increased to restrain the rotational speed of the steering wheel. Therefore, it becomes possible to improve the convergence of the steering wheel without losing quickness in returning of the steering wheel. As a result, when the steering wheel is desired to be returned, there is substantially no need for the driver to positively return the steering wheel to the neutral position and hence a burden to the driver is reduced.

Further, since the quantity of drive of the motor can be decided by combinations of the speed of the vehicle, the rotational speed of the motor and the steering angle, the same advantage as described above can be obtained.

In accordance with still another aspect of this invention, there is provided an electric power steering control apparatus comprising:

a steering torque sensor for detecting a steering torque of a steering system of a vehicle and generating a corresponding output signal;

an electric motor for generating a power assisting force to reduce a steering force of a driver of the vehicle required to impart to the steering system;

motor drive means for driving the electric motor in a direction of reducing the driver's steering force according to at least the output signal of the steering torque sensor;

motor rotational-speed detection means for detecting a rotational speed of the electric motor and generating a corresponding output signal;

a vehicle speed sensor for detecting a speed of the vehicle and generating a corresponding output signal;

duty-ratio decision means for deciding a duty ratio from at least one of the output signals of the steering torque sensor, the motor rotational-speed sensor and the vehicle speed sensor when the steering torque is less than a predetermined value; and motor short-circuit means for short-circuiting the electric motor according to a PWM signal of the duty ratio decided by the duty-ratio decision means.

According to the above-described structure, when the steering torque is less than a predetermined value, the rotational speed of the motor is detected. When the rotational speed of the motor exceeds the predetermined value, the both ends of the motor are short-circuited according to a PWM signal of a predetermined duty ratio to restrain the rotational speed of the motor. Therefore, when, during traveling, the driver lets his or her hands off from the steering wheel to allow the steering wheel to freely return to the neutral position thereof, the steering wheel return speed can be restricted by restraining the rotational speed of the motor. Also, the overshooting during returning of the steering wheel after having been steered from the neutral position can be made smaller. As a result, the convergence and control stability of the steering wheel can be improved.

Also, if the duty ratio with the motor short-circuited is changed according to the speed of the vehicle, the restraining force can be made greater during high-speed travel in which a reaction force from the road becomes greater, and the restraining force can be made smaller during low-speed travel in which a reaction force from the road becomes smaller and the steering wheel becomes difficult to return. As a result, the convergence of the steering wheel during high-speed travel can be improved without reducing the steering wheel return speed during low-speed travel. Therefore, even when the steering wheel is desired to be returned to the neutral position during low-speed travel, there is no need for the driver to positively return the steering wheel to the neutral position, so a burden to the driver can be reduced.

If the duty ratio is changed according to the rotational speed of the motor, a restraining force corresponding to the steering wheel return speed can be generated and the steering wheel return speed can be reduced to less than a certain value. Also, if the duty ratio is changed according to the steering angle, when the driver lets his or her hands free from the steering wheel with a great angle of steering, the duty ratio is reduced to render the steering wheel return speed faster, and when the steering wheel is near the neutral position thereof with the steering angle being smaller, the duty ratio is increased to restrain the rotational speed of the steering wheel. Therefore, it becomes possible to improve the convergence of the steering wheel without losing quickness in the steering wheel return. As a result, when the steering wheel is desired to be returned to the neutral position, there is substantially no need for the driver to positively return the steering wheel and hence a burden to the driver is reduced.

Further, since the duty ratio can be decided by combinations of the speed of the vehicle, the rotational speed of the motor and the steering angle, the same advantages as described above can be obtained.

In a preferred form of this invention, the electric motor is a D.C. motor having a pair of terminals, and the motor rotational-speed detection means comprises motor rotational-speed estimating means for estimating the rotational speed of the motor from an electromotive force generated when the terminals of the D.C. motor are opened.

BRIEF DESCRIPTION OF THE DRAWINGS

The above and other objects, features and advantages of the present invention will become clear from the following detailed description of the preferred embodiments when the same is read in conjunction with the accompanying drawings.

DESCRIPTION OF THE PREFERRED EMBODIMENTS

Preferred embodiments of the present invention will hereinafter be described with reference to the accompanying drawings.

Embodiment 1

Figure 1:
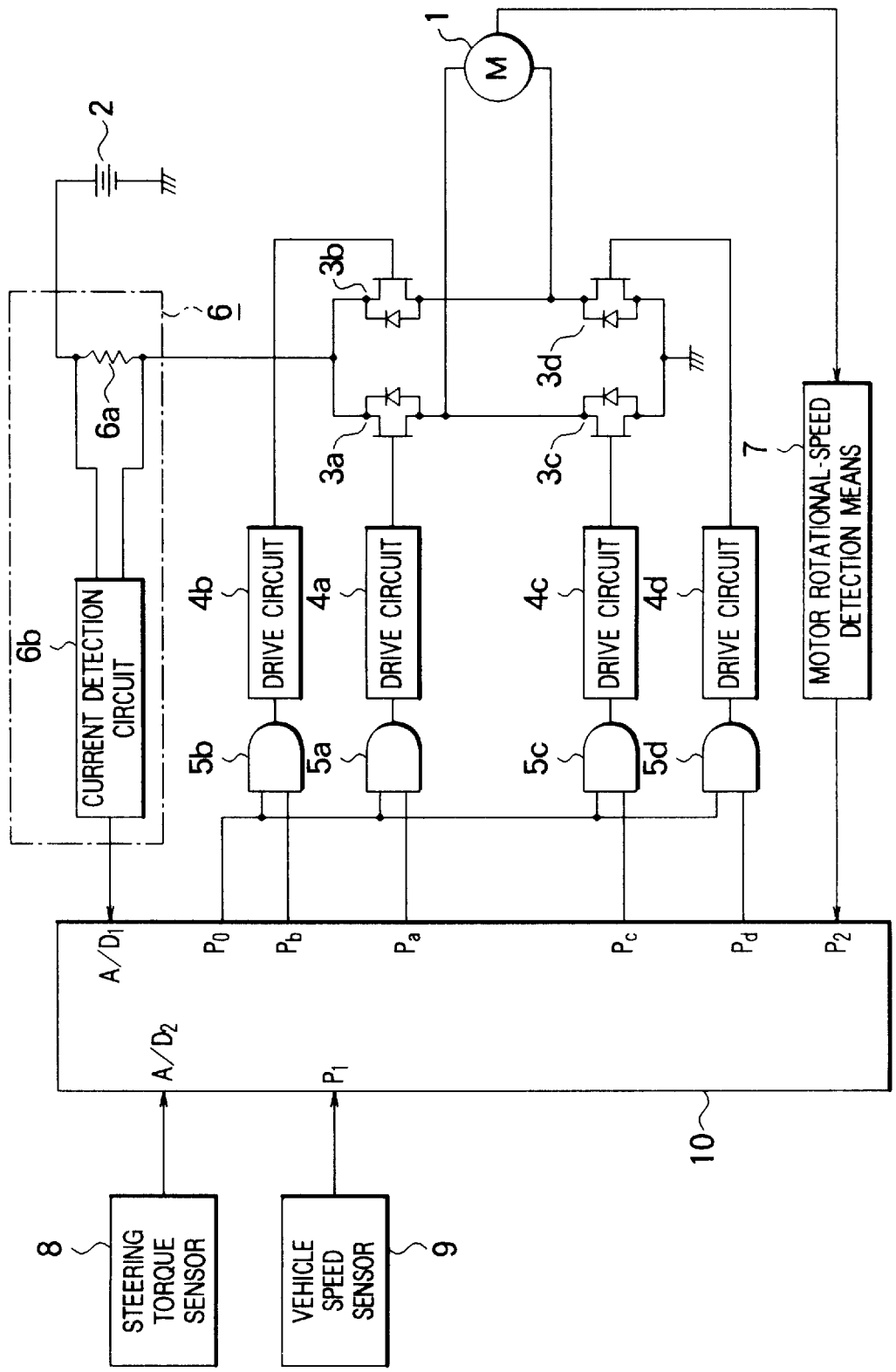
FIG. 1 is a circuit diagram of an electric power steering control apparatus of embodiments 1, 2, 5, and 6 of this invention.

FIG. 1 is a circuit diagram showing one embodiment of the present invention. In this figure, a plurality of transistors 3a, 3b, 3c, and 3d for driving an electric motor 1 in the form of a D.C. motor constitute a bridge circuit. When the transistors 3a and 3d are turned on, the motor 1 is driven in the clockwise direction, and when the transistors 3b and 3c are turned on, the motor 1 is driven in the counterclockwise direction. Drive circuits 4a, 4b, 4c, and 4d receive the output signals of AND circuits 5a, 5b, 5c, and 5d, respectively, to drive the transistors 3a to 3d, the AND circuit being operated in response to the signals output from the output ports Po, Pa, Pb, Pc, and Pd of a microcomputer 10.

A motor current detection means 6 is connected to a power supply 2 and comprises a shunt resistor 6a for detecting a motor current and a current detection circuit 6b for generating a motor current signal corresponding to a terminal voltage across the shunt resistor 6a. The motor current signal from the current detection circuit 6b is input to an A/D converter A/D1 incorporated in the microcomputer 10. A motor rotational-speed detection means 7 detects the rotational speed of the motor 1. In the case of right-handed or clockwise rotation of the motor 1, the rotational speed is detected with a plus value, and in the case of left-handed or counterclockwise rotation, the rotational speed is detected with a minus value. The detected value is input to an input port P2 of the microcomputer 10. A steering torque sensor 8 detects a steering torque imparted to an unillustrated steering column and generates a corresponding torque signal which is input to an A/D converter A/D2 incorporated in the microcomputer 10. A vehicle speed sensor 9 detects a vehicle speed and generates a corresponding speed signal which is input to an input port P1 of the microcomputer 10.

Next, the operation of the transistors 3a to 3d constituting the bridge circuit will be described. When a pulse width modulation (PWM) signal from the output port Po of the microcomputer 10 is output to the transistors 3a to 3d and when the output ports Pa to Pd go high, the transistors 3a to 3d will be PWM-operated, i.e., operated in a pulse width modulation mode. Therefore, when the output ports Pa and Pd go high and when the output ports Pb and Pc go low, the transistors 3a and 3d are PWM operated and the transistors 3b and 3c are turned off. As a result, the motor 1 is driven to rotate in the clockwise direction. Also, when the output ports Pa and Pd go low and when the output ports Pb and Pc go high, the transistors 3a and 3d are turned off and the transistors 3b and 3c are PWM-operated. As a result, the motor 1 is driven in the counterclockwise direction.

Figure 4:
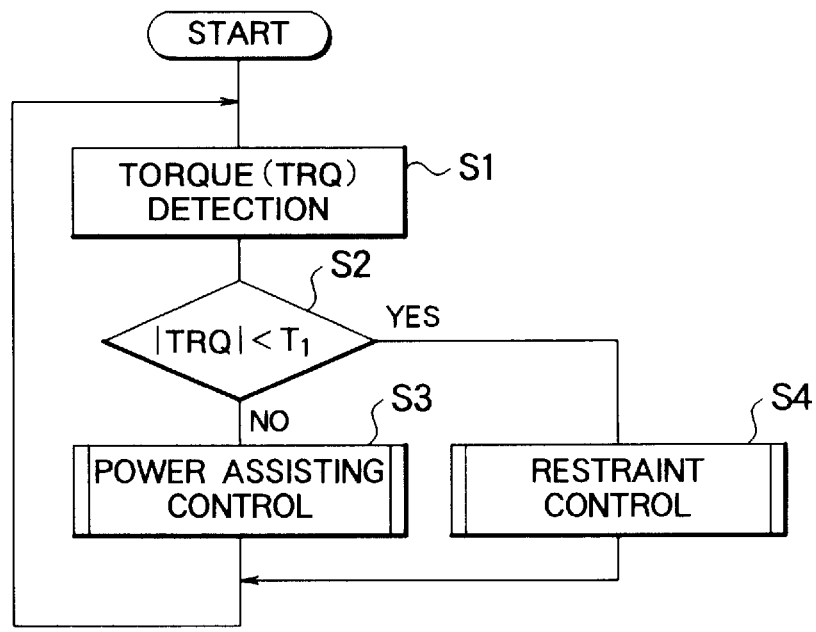
FIG. 4 is a flow chart of the main program of the embodiments 1 to 3 and 5 to 7 of the invention.

Next, the entire operation of the first embodiment described above and shown in FIG. 1 will be described. FIG. 4 is a flow chart of a main program of this embodiment. First, a steering torque TRQ is detected by the steering torque sensor 8 (step S1). If the absolute value of the steering torque TRQ is more than or equal to a predetermined value T1 (for example, 1 N·m), power assist control will be performed in step S3. If, on the other hand, the absolute value of the steering torque TRQ is less than me predetermined value T1, restraint control will be performed in step S4.

Figure 5:
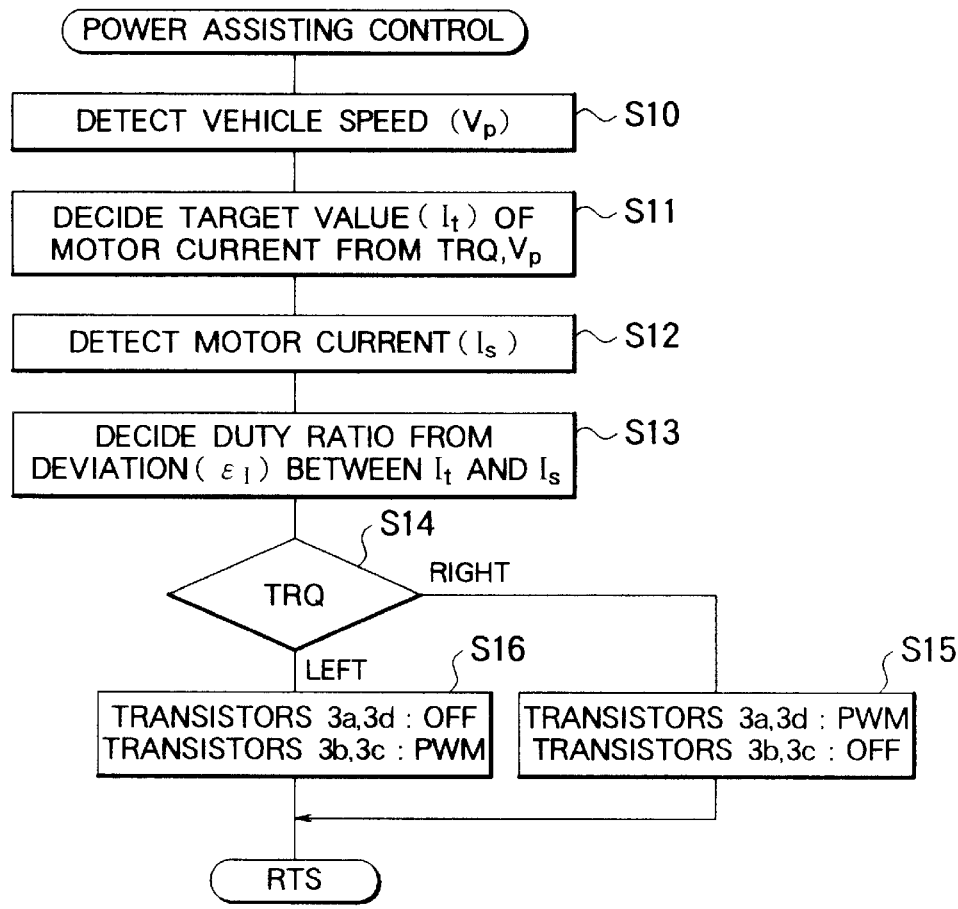
FIG. 5 is a flow chart of the cower assisting control of the embodiments 1 to 8 of the invention.

The power assisting control is performed according to a flow chart shown in FIG. 5. First, the speed Vp of the vehicle is detected by the vehicle speed sensor 9 (step S10). The target value It of the motor current is decided from the steering torque TRQ detected in the step S1 of FIG. 4 and the speed Vp detected in the step S10 (step S11). In step S12, the motor current is detected from the motor-current detection means 6, and in step S13 a duty ratio with which the deviation cI between the target value It of the motor current and the detected current value $I_s$ becomes zero is decided.

If the steering torque TRQ indicates a right-handed or clockwise rotation, the control process will advance from step S14 to step S15. In the step S15, the transistors 3a and 3d are PWM-driven with the duty ratio decided in the step S13 and the transistors 3b and 3c are turned off, so that the motor 1 is driven in the clockwise direction. If the steering torque TRQ indicates a left-handed or counter-clockwise rotation, the control process will advance from step S14 to step S16. In the step S16, the transistors 3a and 3d are turned off and the transistors 3b and 3c are PWM driven with the duty ratio decided in the step S13, so that the motor 1 is driven in the counterclockwise direction.

Figure 6:
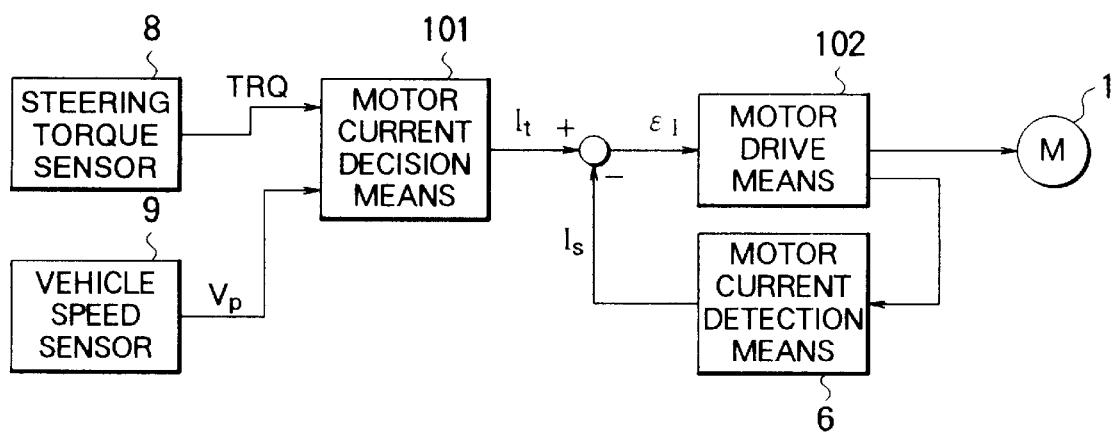
FIG. 6 is a block diagram of the power assisting control of the embodiments 1 to 8 of the invention.

FIG. 6 is a block diagram showing the power assisting control described above. In the figure, a motor-current decision means 101 decides the target value It of the motor current from the steering torque TRQ detected by the steering torque sensor 8 and the vehicle speed Vp detected by the vehicle speed sensor 9. A motor drive means 102 drives the motor 1 so that the deviation eI between the target value It of the motor current and the actual motor current $I_s$ detected by the motor-current detection means 6 becomes zero.

The motor-current decision means 101 perform an operation corresponding to the step S11 of FIG. 5, while the motor drive means 102 perform an operation corresponding to the steps S13 to S16 of FIG. 5. In FIG. 6, assuming that the steering torque in the clockwise direction be expressed by a plus quantity, the steering torque in the counterclockwise direction by a minus quantity, a current driving the motor 1 in the clockwise direction by a plus quantity, and a current driving the motor 1 in the counterclockwise direction by a minus quantity, then a motor current characteristic such as that shown in FIG. 7 will be obtained.

Figure 7:
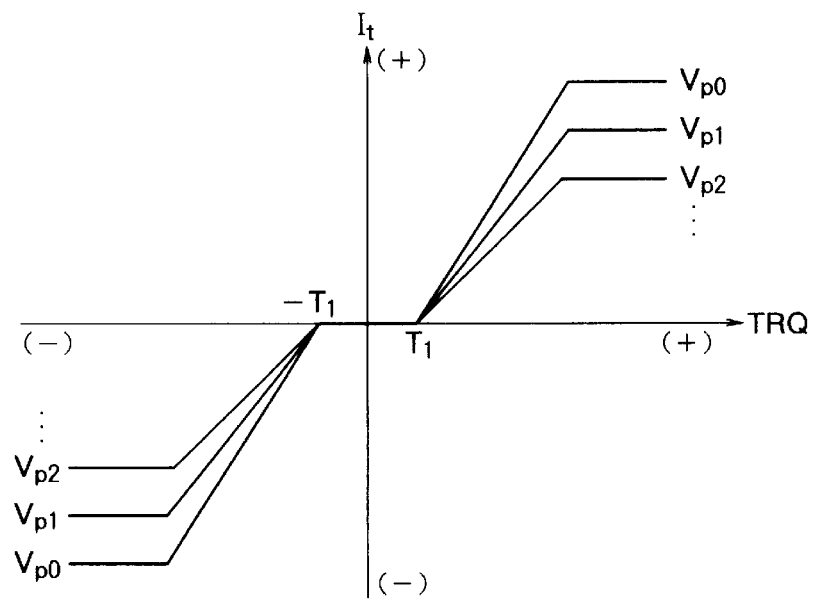
FIG. 7 is a motor current characteristic diagram of the embodiments 1 to 8 as power is being assisted of the invention.

In FIG. 7, Vp0 represents a current characteristic when the vehicle is in a stopped or stationary state. As the speed of the vehicle increases, the current characteristic changes as shown by Vp1 and Vp2. Thus, when the power assisting control is performed, a current corresponding to the vehicle speed and a steering torque applied by a driver or operator of a vehicle to the steering wheel flows in the motor 1. Therefore, a power assisting force corresponding to the speed and the steering torque is produced, thus reducing a steering force required of the driver.

Figure 8:
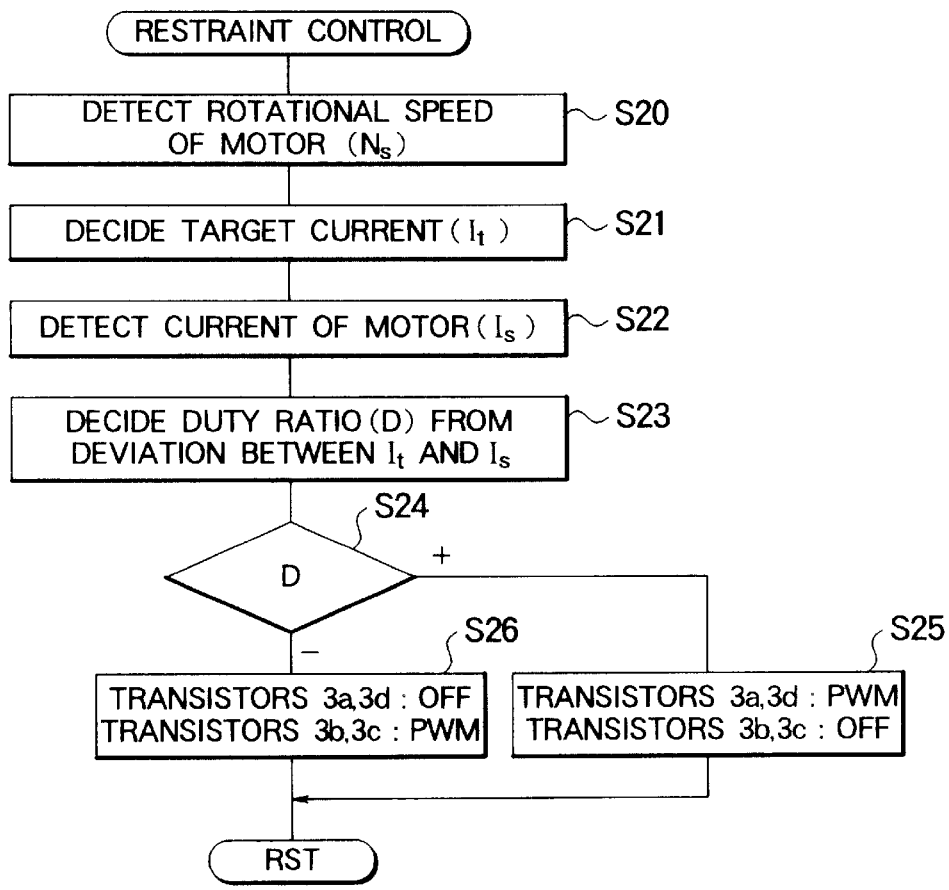
FIG. 8 is a flow chart of the restraint control of the embodiment 1 of the invention.

Next, the restraint control will be described FIG. 8 is a flow chart showing the restraint control. In step S20 a motor rotational speed Ns is detected by the motor rotational-speed detection means 7. In step S21 a target current It corresponding to the motor rotational speed detected in the step S20 is decided with the characteristic diagram of the target current decision means of FIG. 10. In step S22 a motor current $I_s$ is detected. In step S23 there is decided a duty ratio D with which the deviation εI between the target current It decided in the step S21 and the motor current $I_s$ detected in the step S22 becomes zero.

If the duty ratio D is a plus quantity, step S24 will advance to step S25. In the step S25, the transistors 3a and 3d are PWM-driven with the duty ratio D decided in the step S23, the transistors 3b and 3c are turned off, and the motor 1 is driven in the clockwise direction. If, on the other hand, the duty ratio D is a minus quantity, the step S24 will advance to step S26. In the step S26, the transistors 3a and 3d are turned off, the transistors 3b and 3c are PWM-driven with the duty ratio D decided in the step S23, and the motor 1 is driven in the counterclockwise direction.

Figure 9:
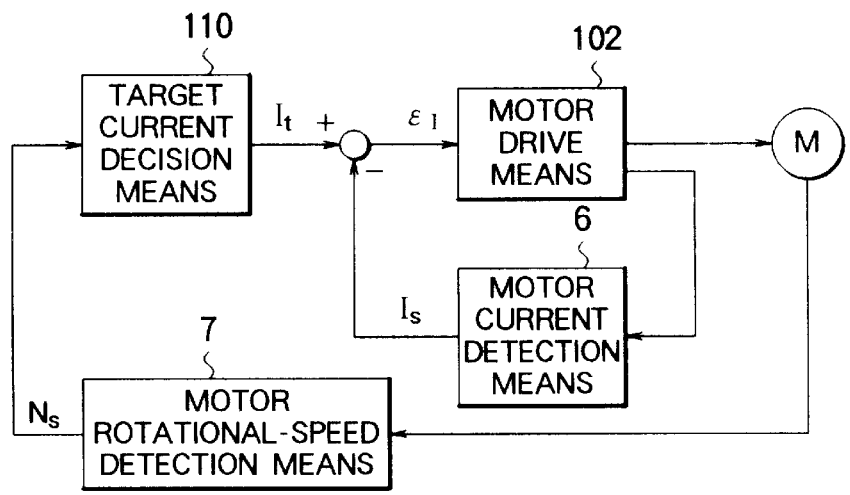
FIG. 9 is a block diagram of the restraint control of the embodiments 1 and 4 of the invention.
Figure 10:
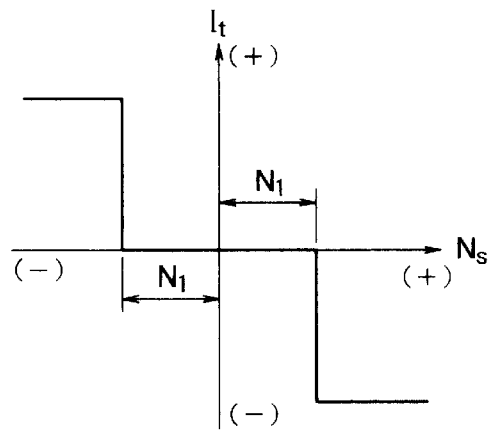
FIG. 10 is a characteristic diagram of the target-current deciding means of the restraint control of the embodiments 1 to 4 of the invention.

FIG. 9 is a block diagram showing the operation of the restraint control. In the figure, a target current decision means 110 decides the target value It of the motor current from the detected value Ns of the motor rotational-speed detection means 7. FIG. 10 shows the characteristic of the target current decision means 110.

Figure 11:
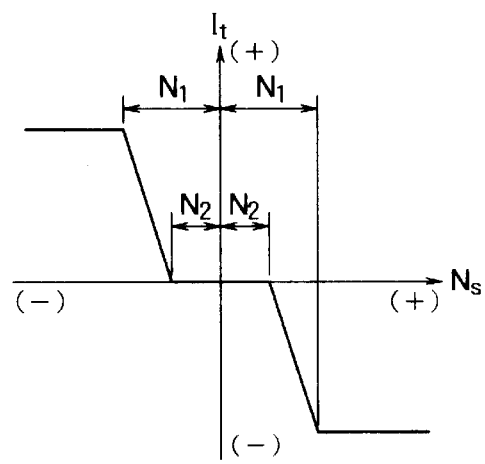
FIG. 11 is a characteristic diagram of the target current deciding means of the restraint control of the embodiment 1 of the invention.

The plus quantity of the motor rotational speed Ns represents a right-handed or clockwise rotation, and the minus quantity represents a left-handed rotation. The plus quantity of the motor current target value It represents right-handed or clockwise driving, and the minus quantity represents left-handed or counter-clockwise driving. When the absolute value of the rotational speed of the motor exceeds a predetermined value N1 (for example, 1000 rpm), the motor will be driven to rotate in the direction opposite to the direction of rotation in which it has been rotating. Therefore, the motor 1 is controlled so that the rotational speed thereof does not exceed the predetermined value N1. Also, If the target current decision means 110 has a characteristic such as that shown in FIG. 11, the motor rotational speed will be balanced at a suitable position between N2 and N1, and hunting such as that produced in the characteristic of FIG. 10 will not occur.

As described above, if the steering torque during steering becomes more than the predetermined value T1, the steering force required of the driver can be reduced by the power assisting control. Also, if the steering torque becomes less than the predetermined value T1 during steering, the motor will be operated under the restraint control so that the motor rotational speed does not exceed the predetermined value N1. As a result, the steering wheel return speed can be restrained. Also, when the steering wheel returns to the straight travel state (the neutral position) after it has been steered to the right or left during high-speed travel, the steering wheel return speed is restrained even if the reaction force from the road surface is great. Therefore, overshooting during returning is reduced and the convergence and control stability of the steering wheel are improved. In addition, even if an excessive reaction force occurs, the burden to the driver is reduced by restraining shock on the steering wheel.

Embodiment 2

Next, another embodiment of the present invention will be described. The circuit diagram, flow chart of the main program, and flow chart of the power assisting control of this embodiment are identical with those shown in FIGS. 1, 4 and 5 of the above described embodiment 1, so a description thereof will not be given.

Figure 12:
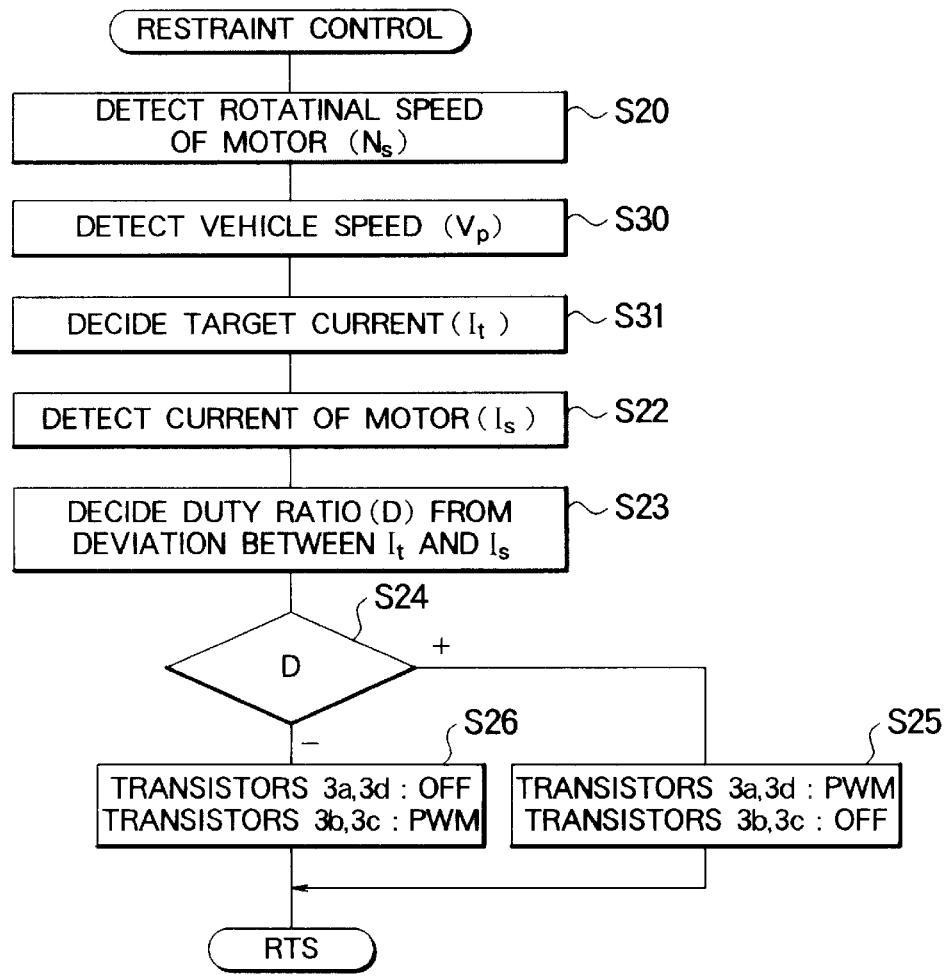
FIG. 12 is a flow chart of the restraint control of the embodiment 2 of the invention.
Figure 14:
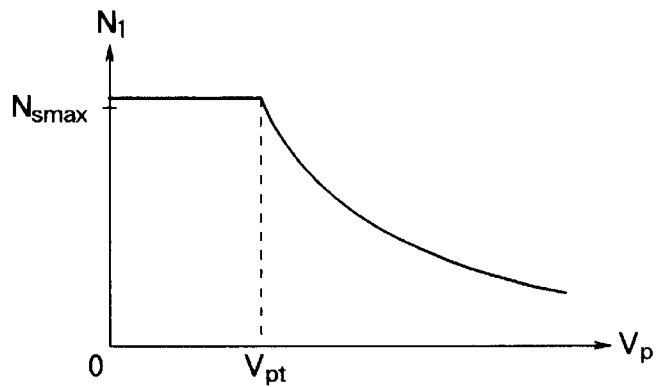
FIG. 14 is a characteristic diagram of the target-current deciding means of the restraint control of the embodiment 2 of the invention.

FIG. 12 is a flow chart showing the restraint control of this embodiment. In step S20 a motor rotational speed Ns is detected from the motor rotational-speed detection means 7, and in step S30 a vehicle speed Vp is detected by the vehicle speed sensor 9. In step S31 a target current It corresponding to the motor rotational speed Ns detected in the step S20 and to the vehicle speed Vp detected in the step S30 is decided with the characteristic diagram of the target current decision means, as shown in FIGS. 10 and 14. In step S22 a motor current $I_s$ is detected, and in step S23 there is decided a duty ratio D such that the deviation εI between the target current It decided in the step S31 and the motor current $I_s$ detected in the step S22 becomes zero.

If the duty ratio D is a plus quantity, the control process proceeds from step S24 to step S25. In the step S25, transistors 3a and 3d are PWM-driven with the duty ratio D decided in the step S23, transistors 3b and 3c are turned off, and motor 1 is driven in the clockwise direction. If, on the other hand, the duty ratio D is a minus quantity, the control process proceeds from step S24 to step S26. In the step S26, the transistors 3a and 3d are turned off, and the transistors 3b and 3c are PWM-driven with the duty ratio D decided in the step S23, so that the motor 1 is driven in the counterclockwise direction.

Figure 13:
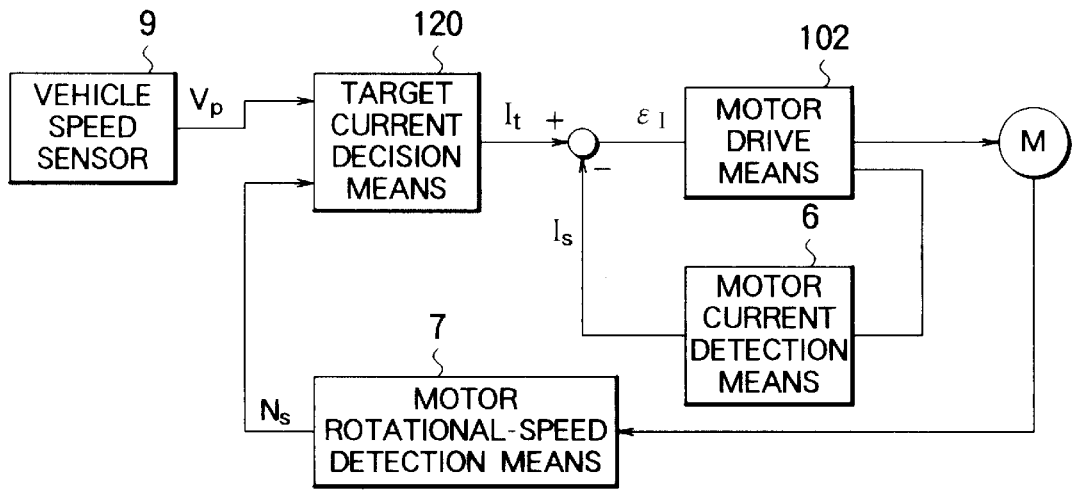
FIG. 13 is a block diagram of the restraint control of the embodiment 2 of the invention.

FIG. 13 is a block diagram showing the operation of the restraint control of this embodiment. In the figure, a target-current decision means 120 decides the target value It of the motor current from the detected value Ns of the motor rotational-speed detection means 7 and the detected value Vp of the vehicle speed sensor 9. FIGS. 10 and 14 show the characteristic of the target-current decision means 120.

In FIG. 10, the plus quantity of the motor rotational speed Ns represents a right-handed or clockwise rotation, and the minus quantity represents a left-handed or counterclockwise rotation. The plus quantity of the motor current target value It represents a right-handed or clockwise drive, and the minus quantity represents a left-handed or counter-clockwise drive. If the absolute value of the rotational speed of the motor 1 exceeds a predetermined value N1, the motor 1 will be driven in the direction opposite to the direction of rotation in which it has been rotating. Therefore, the motor 1 is controlled so that the rotational speed does not exceed the predetermined value N1.

Also, in FIG. 14, when the speed Vp is less than Vpt (for example, 30 km/h), N1 is set to a value greater than a maximum value Nsmax for the detection value of the motor rotational-speed detection means 7, so the motor rotational speed is not restrained.

As described above, if the steering torque during steering becomes more than a predetermined value T1, the steering force required of the driver can be reduced by the power assisting control Also, if the steering torque becomes less than the predetermined value T1 during steering, the motor will be operated under the restraint control so that the motor rotational speed does not exceed the predetermined value N1. As a result, the steering wheel return speed can be restrained. Also, when the steering wheel returns to the straight travel state position or neutral position after it has been steered to the right or left during high-speed travel, the steering wheel return speed is restrained even if the reaction force from the road surface is great. Therefore, overshooting during returning is reduced and the convergence and control stability of the steering wheel can be improved. In addition, even if an excessive reaction force occurs, the burden to the driver is reduced by restraining shock on the steering wheel.

Further, as shown in FIG. 14, the predetermined value N1 is decreased as the speed Vp increases. Therefore, since the steering wheel return speed is restrained during high-speed travel, in which a reaction force from the road surface becomes greater, and the steering wheel return speed is not restrained during low-speed travel (for example, less than 30 km/h) in which a reaction force from the road surface becomes smaller, the convergence and control stability of the steering wheel during high-speed travel is improved without reducing the steering wheel return speed during low-speed travel. With this, there is no need for the driver to positively return the steering wheel to the neutral position even during low-speed travel, so the burden to the driver is reduced.

Embodiment 3

Figure 2:
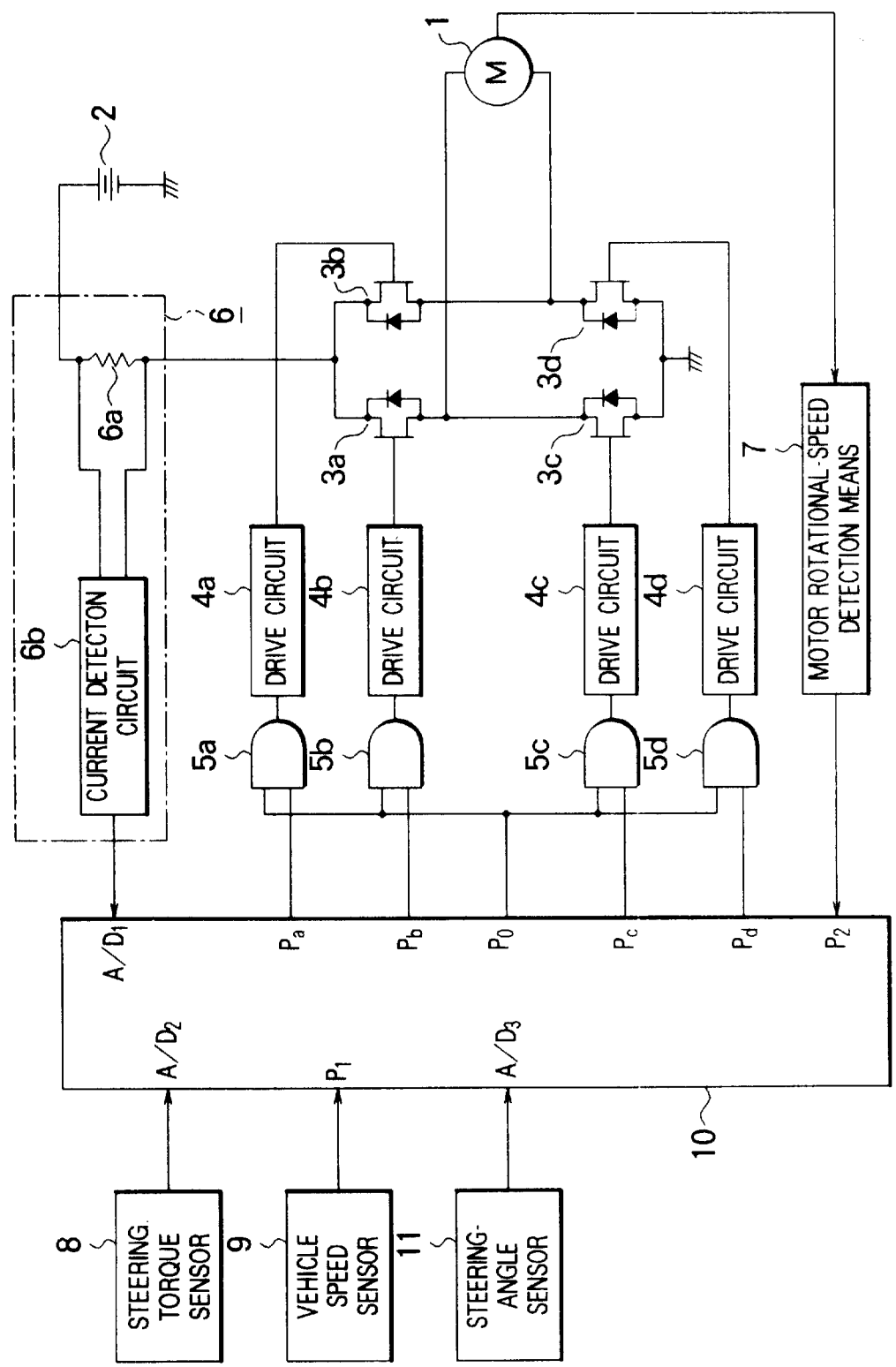
FIG. 2 is a circuit diagram of an electric power steering control apparatus of embodiments 3 and 7 of the invention.

FIG. 2 is a circuit diagram showing a third embodiment of this invention. The embodiment of FIG. 2 is identical with the embodiment of FIG. 1, except that a steering-angle sensor 11 is provided for detecting an angle of steering of the steering wheel and generating a corresponding output signal of analog form, and an A/D converter A/D3 is incorporated into the microcomputer 10 of FIG. 1 to convert the output signal of the steering-angle sensor 11 from analog into digital form and input the digitized signal to the microcomputer 10. Also, the flow charts for the main program and the power assisting control are identical with those of FIGS. 4 and 5.

Figure 15:
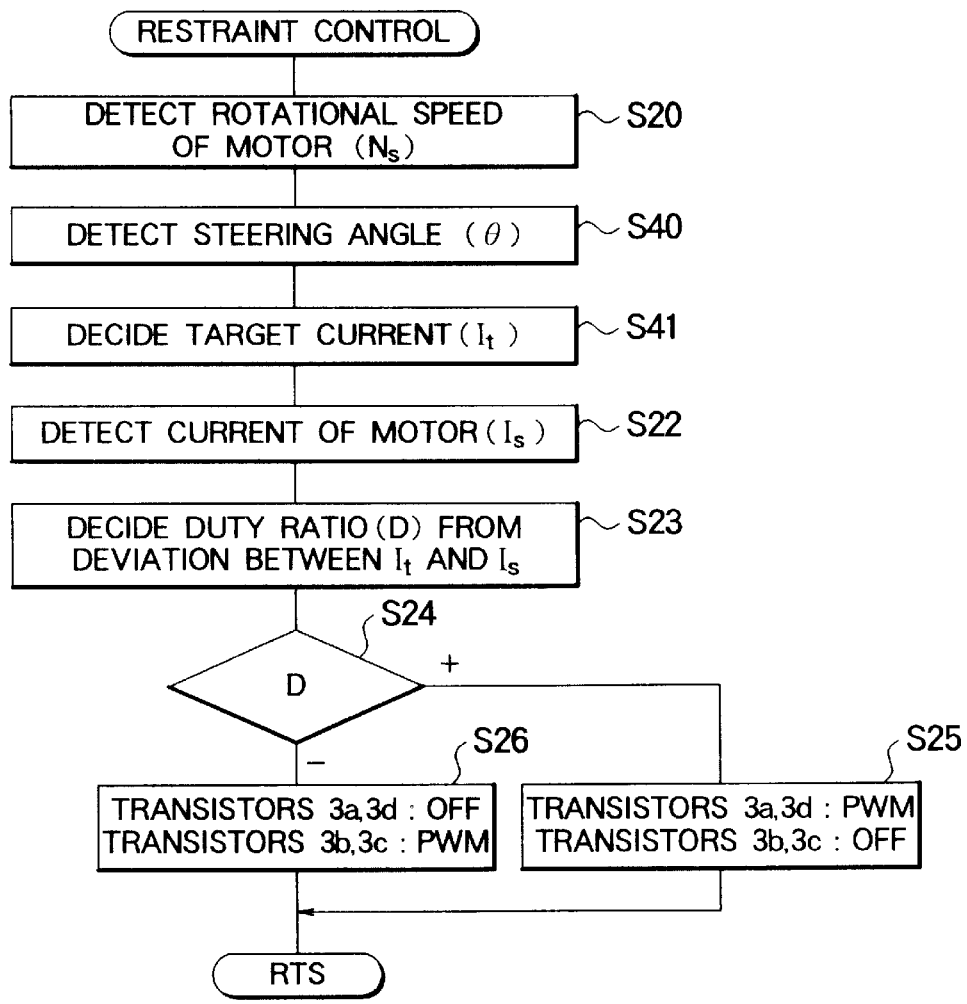
FIG. 15 is a flow chart of the restraint control of the embodiment 3 of the invention.
Figure 17:
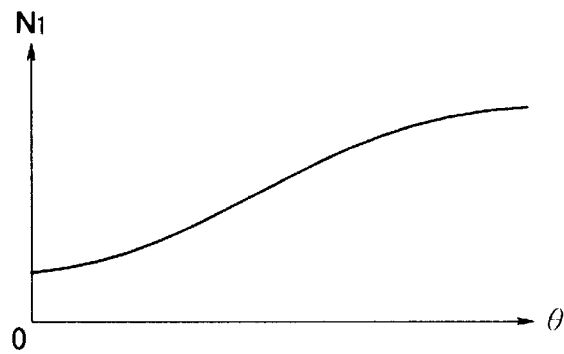
FIG. 17 is a characteristic diagram of the target-current deciding means of the restraint control of the embodiment 3 of the invention.

FIG. 15 is a flow chart showing the restraint control of this embodiment In step S20 a motor rotational speed Ns is detected by the motor rotational-speed detection means 7, and in step 40 a steering angle is detected by the steering-angle sensor 11. In step S41 a target current It corresponding to the motor rotational speed Ns detected in the step S20 and to the steering angle detected in the step S40 is decided with the characteristic diagram of the target current decision means, as shown In FIGS. 10 and 17. In step S22 a motor current $I_s$ is detected. In step S23 there is decided a duty ratio D such that the deviation ∊I between the target current It decided in the step S41 and the motor current $I_s$ detected in the step S22 becomes zero.

If the duty ratio D is a plus quantity, the control process proceeds from step S24 to step S25. In the step S25, transistors 3a and 3d are PWM-driven with the duty ratio D decided in the step S23, and transistors 3b and 3c are turned off, so that a motor 1 is driven to rotate in the clockwise direction. If, on the other hand, the duty ratio D is a minus quantity, the control process proceeds from step S24 to step S26. In the step S26, the transistors 3a and 3d are turned off, and the transistors 3b and 3c are PWM-driven with the duty ratio D decided in the step S23, so that the motor 1 is driven to rotate in the counterclockwise direction.

Figure 16:
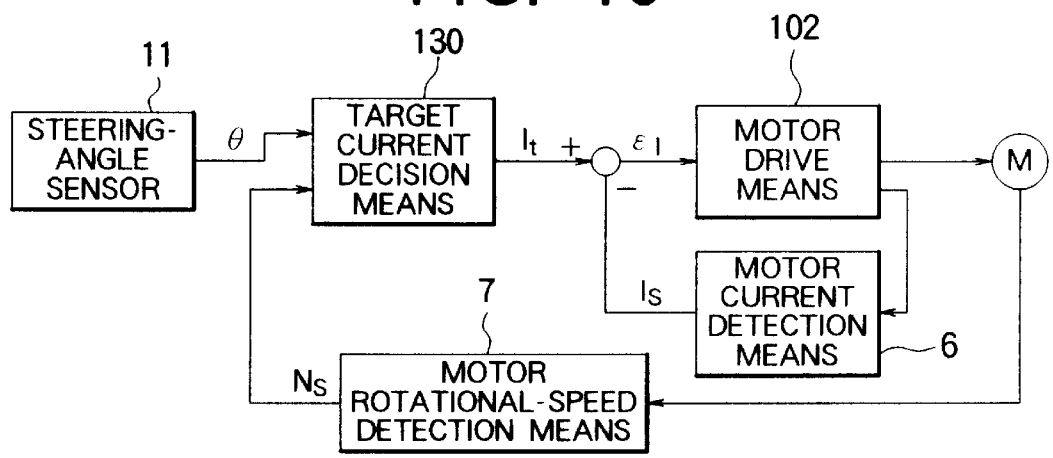
FIG. 16 is a block diagram of the restraint control of the embodiment 3 of the invention.

FIG. 16 is a block diagram showing the operation of the restraint control of this embodiment. In the figure, a target-current decision means 130 decides the target value It of the motor current from the detected value Ns of the motor rotational-speed detection means 7 and the detected value of the steering-angle sensor 11. FIGS. 10 and 17 show the characteristic of the target-current decision means 130.

In FIG. 10, the plus quantity of the motor rotational speed Ns represents a right-handed or clockwise rotation, and the minus quantity represents a left-handed or counter-clockwise rotation. The plus quantity of the motor current target value It represents the right-handed drive of the motor 1, and the minus quantity represents the left-handed drive of the motor 1. If the absolute value of the rotational speed of the motor 1 exceeds a predetermined value N1, the motor 1 will be driven to rotate in the direction opposite to the direction of rotation in which it has been rotating. Therefore, the motor 1 is controlled so that the rotational speed thereof does not exceed the predetermined value N1.

As described above, if the steering torque during steering becomes more than a predetermined value T1, the steering force as required of the driver can be reduced by the power assisting control. Also, if the steering torque becomes less than the predetermined value T1 during steering with free hands of the driver, the motor will be operated under the restraint control so that the motor rotational speed does not exceed the predetermined value N1. As a result, the steering wheel return speed can be restrained. Also, when the steering wheel returns to the straight travel state by the driver's removing his or her hands from the steering wheel after it has been steered to the right or left during high-speed travel, the steering wheel return speed is restrained even if the reaction force from the road surface is great. Therefore, overshooting during returning becomes smaller and the convergence and control .stability of the steering wheel is improved. In addition, even if an excessive reaction force occurs, the burden to the driver is reduced by restraining shock on the steering wheel.

Further, as shown in FIG. 17, the predetermined value N1 is increased as the steering angle increases. Therefore, since the restraining force of the steering wheel return speed becomes smaller as the steering angle increases, and since the restraining force of the steering wheel return speed becomes greater as the steering angle decreases, the convergence and control stability of the steering wheel is improved without reducing the steering wheel return speed when the steering wheel is greatly steered. Therefore, after the steering wheel has been steered to a great extent, there is no need for the driver to positively return the steering wheel to the neutral position so the burden to the driver is reduced.

Embodiment 4

Figure 3:
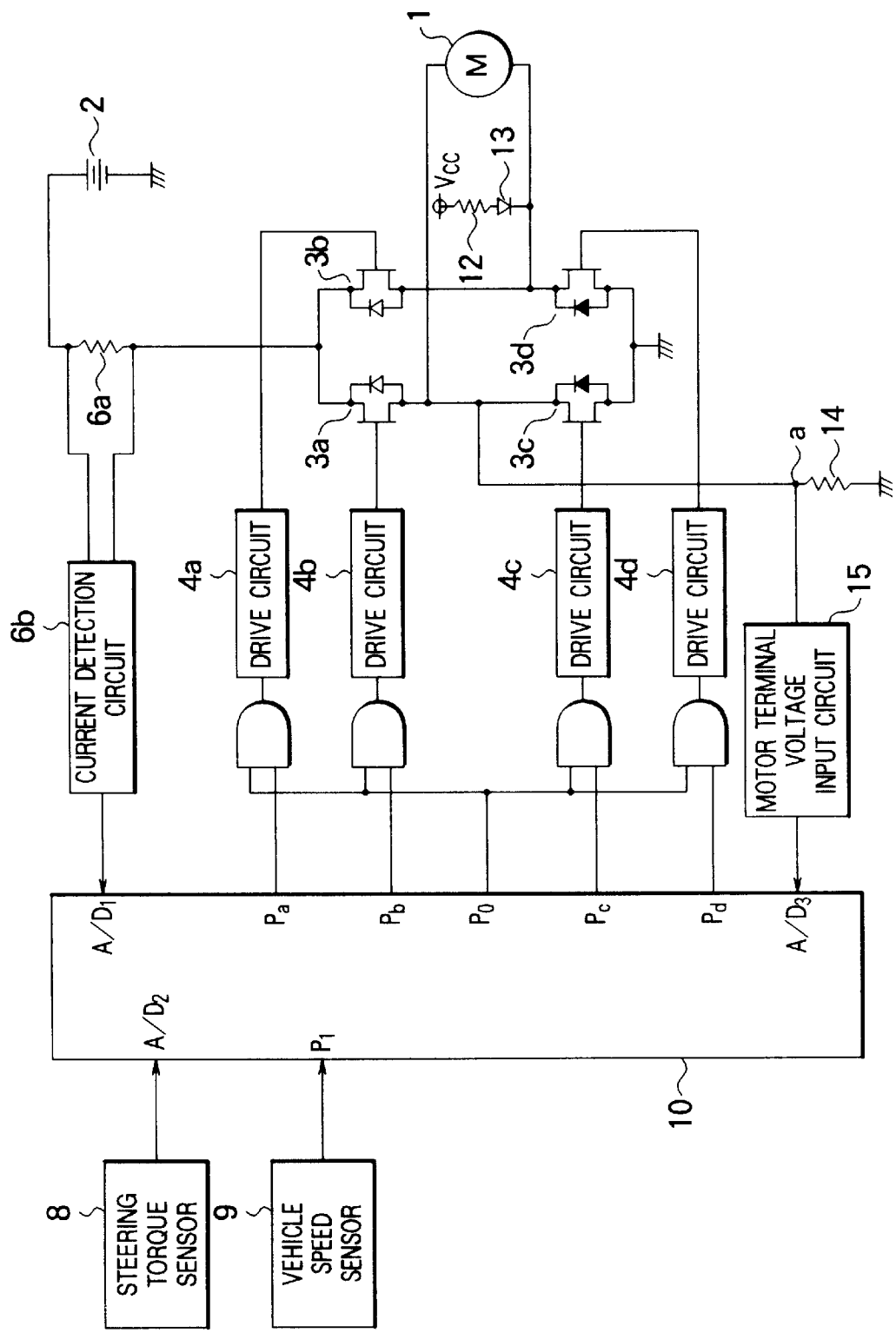
FIG. 3 is a circuit diagram of an electric power steering control apparatus of embodiments 4 and 8 of the invention.

FIG. 3 is a circuit diagram showing a fourth embodiment of this invention. In the figure, a motor current flows from a power supply Vcc of, for example, 5 V for an A/D converter incorporated in the microcomputer 10 to ground through a resistor 12, a diode 13, a motor 1 and a resistor 14. When transistors 3a to 3d are off and the motor 1 is in its deenergized state, the voltage on a point a is set to Vcc. A motor terminal voltage input circuit 15 is constituted by a low pass filter and a protective circuit. The voltage on the point a is input to an A/D converter A/D3 of the microcomputer 10, and the motor terminal voltage is detected.

Figure 18:
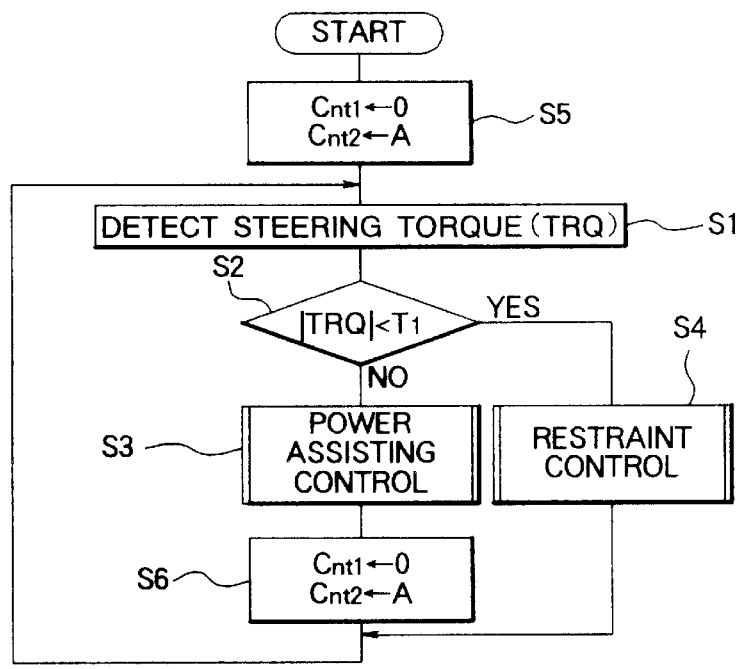
FIG. 18 is a flow chart of the main program of the embodiments 4 and 8 of the invention.

Next, FIG. 18 is a flow chart showing the main program of this embodiment. In the figure, counters Cnt1 and Cnt2 are initialized in step S5. In step S1 a steering torque is detected, and in step S2 it is decided whether the absolute value of the steering torque is less than a predetermined value T1. If the absolute value is more than the predetermined value T1, power assisting control will be performed in step S3. Also, in step S6, counters Cnt1 and Cnt2 are set to predetermined values 0 and A, respectively, and then the step S6 returns back to the step 1. If the absolute value is less than the predetermined value T1, restraint control will be performed in step S4, and the control process will then return back from the step S4 to the step S1. In this connection, it is to be noted that a flow chart for the power assisting control in step S3 is identical with that of FIG. 5.

Figure 19:
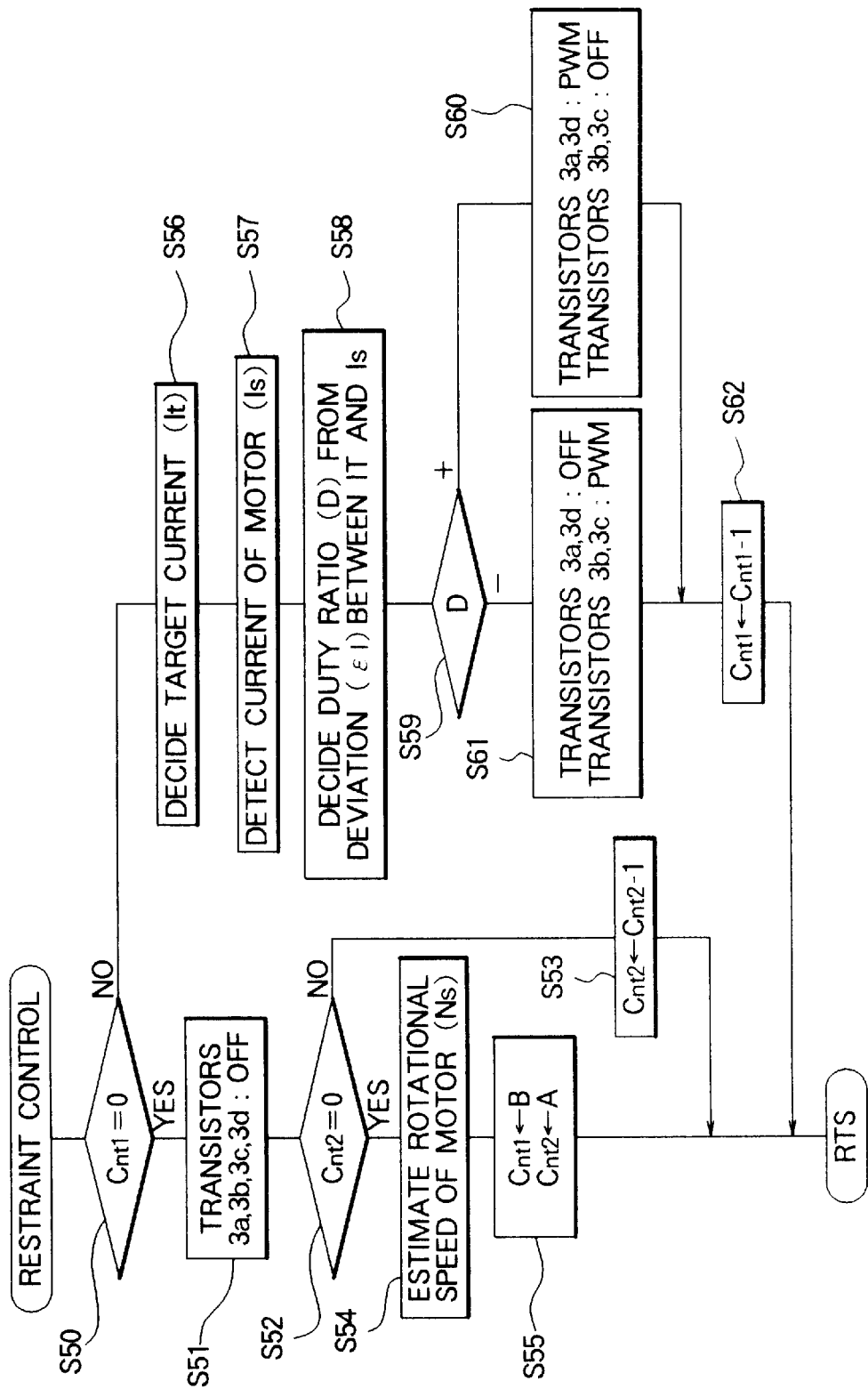
FIG. 19 is a flow chart of the restraint control of the embodiment 4 of the invention.

A flow chart for the restraint control in step S4 is shown in FIG. 19. Since the initial value of the counter Cnt1 has been set to zero, it is determined in step S50 whether the counter Cnt1 is zero. If "YES," the control process proceeds from step S50 to step S51. In the step S51, transistors 3a to 3d are turned off amd the control process proceeds from step S51 to step S52. The initial value of the counter Cnt2 has been set to the predetermined value A, and it is determined in step S52 whether the counter Cnt2 is zero. If "NO,", the control process proceeds from step S52 to step S53. In the step S53 the counter Cnt2 is decremented, and the control process then returns to step S50 and is repeated until the counter Cnt2 becomes zero.

Figure 20:
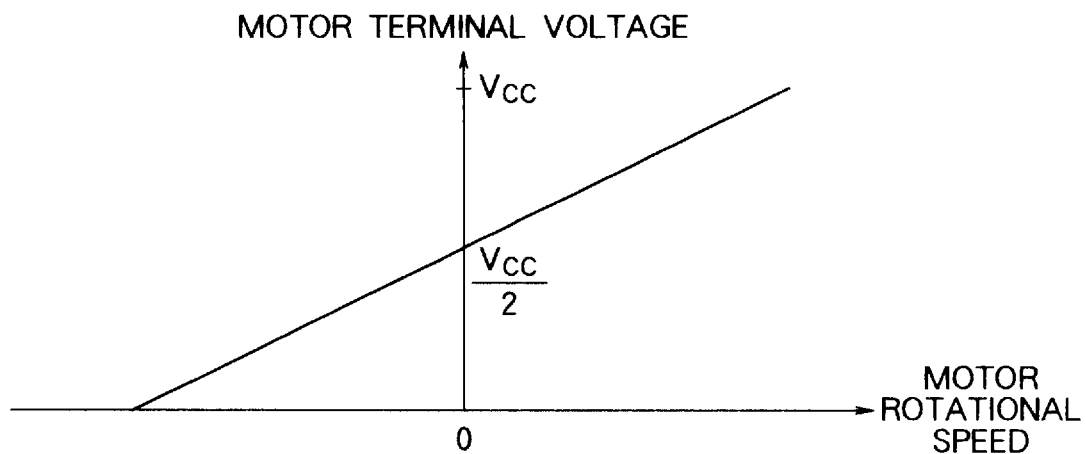
FIG. 20 is a characteristic diagram of the motor terminal voltage to the motor rotational speed of the embodiments 4 and 8 of the invention.

However, if the state in which the predetermined value of the steering torque is less than T1 continues, the restraint control will be performed again. In that case, the counter Cnt2 has been initialized to the predetermined value A. If the restraint control in the step S4 is continuously executed for a predetermined period of time (for example, 4 msec), the counter Cnt2 will become 0 and thereafter the process proceeds from step S52 to step S54. In the step S54 a motor rotational speed Ns is estimated from the terminal voltage of the motor 1. At this time, the transistors 3a to 3d are off, so the relationship between the motor terminal voltage and the motor rotational speed goes to a state as shown in FIG. 20. At this time, from the motor terminal voltage, the right-handed rotation of the motor rotational speed can be detected as a plus value, and the left-handed rotation can be detected as a minus value.

Thereafter, in step S55, predetermined values B and A are substituted or put into the counters Cnt1 and Cnt2 respectively, and then the restraint control is ended. Further, if the state in which the absolute value of the steering torque is less than the predetermined value T1 continues, the restraint control will be performed again. Since the counter Cnt1 has been set to the predetermined value B, the control process proceeds from step S50 to step S56. In the step S56, the target value It of the motor current is decided according to the motor rotational speed Ns estimated in the step S54. In step S57 a motor current $I_s$ is detected. In step S58 there is decided a duty ratio D such that the deviation ∈I between the target value It of the motor current decided in the step S56 and the detected value $I_s$ of the motor current detected in the step S57 becomes zero.

If the duty ratio D is a plus quantity, the control process proceeds from step S59 to step S60. In the step S60, transistors 3a and 3d are PWM-driven with the duty ratio D decided in the step S58, and transistors 3b and 3c are turned off, so that the motor 1 is driven to rotate in the clockwise direction. If, on the other hand, the duty ratio D is a minus quantity, the control process proceeds from step S59 to step S61. In the step S61, the transistors 3a and 3d are turned off, and the transistors 3b and 3c are PWM-driven with the duty ratio D decided in the step S58, so that the motor 1 is driven to rotate in the counterclockwise direction. Thereafter, in step S62 the counter Cnt1 is decremented, and the process returns to step S50 and then repeated until the counter Cnt1 becomes zero.

Further, if the state in which the absolute value of the steering torque is less than the predetermined value T1 continues, the restraint control will be performed again. The operations from the step S5 to the step S62 are repeated until Cnt1 becomes 0 (for example, for 10 msec). The block diagram at that time goes to a state as shown in FIG. 9, so the same effect as the embodiment 1 can be obtained.

As described above, if the steering torque during steering becomes more than a predetermined value T1, the steering force as required of the driver can be reduced by the power assisting control. Also, if the steering torque becomes less than the predetermined value T1 during steering, the motor 1 will be operated under the restraint control so that the motor rotational speed does not exceed the predetermined value N1. As a result, the steering wheel return speed is restrained. Also, when the steering wheel returns to the straight travel state after it has been steered to the right or left during high-speed travel, the steering wheel return speed is restrained even if the reaction force from the road surface is great. Therefore, overshooting during returning is smaller and the convergence and control stability of the steering wheel is improved. In addition, even if an excessive reaction force occurs, the burden to the driver is reduced by restraining shock on the steering wheel. Further, since the rotational speed of the motor can be detected without additionally providing a special sensor for detecting the motor rotational speed, the production cost can be reduced.

Embodiment 5

Figure 21:
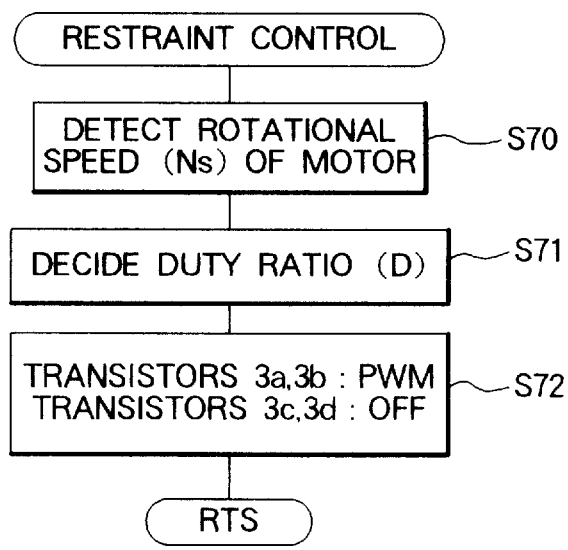
FIG. 21 is a flow chart of the restraint control of the embodiment 5 of the invention.

A fifth embodiment of the present invention will hereinafter be described. The circuit diagram, flow chart of the main program, and flow chart of the power assisting control of this embodiment are identical with those of FIGS. 1, 4 and 5 of the above-described embodiment 1. FIG. 21 is a flow chart showing the restraint control of this embodiment. In the figure, first, in step S70 a motor rotational speed Ns is detected from a motor rotational-speed detection means 7. In step S71 a duty ratio D corresponding to the motor rotational speed is decided. In step S72, transistors 3a and 3b are PWM-driven with the duty ratio D decided in the step S71, and transistors 3c and 3d are turned off.

Figure 24:
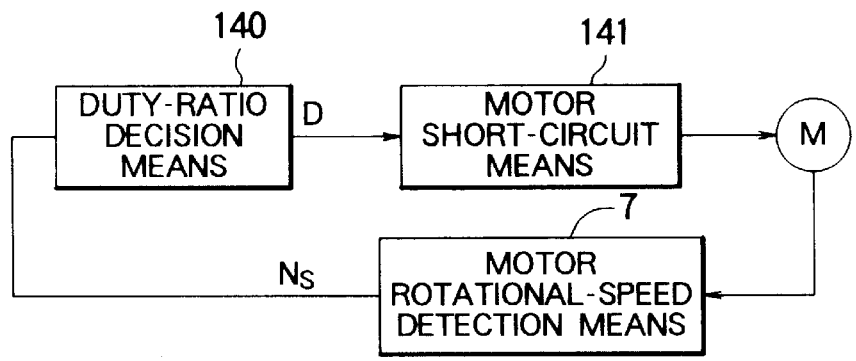
FIG. 24 is a block diagram of the restraint control of the embodiment 5 of the invention.
Figure 25:
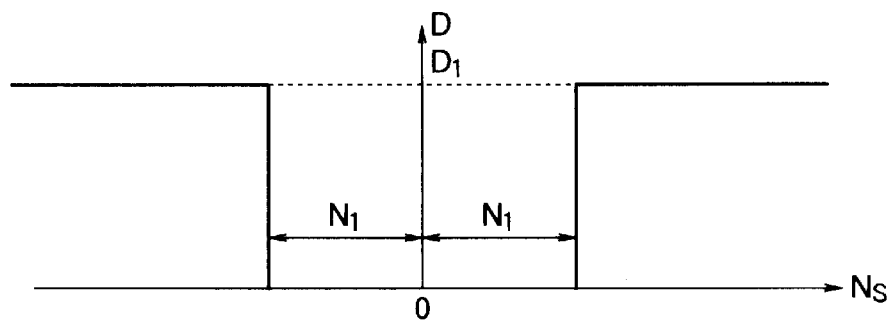
FIG. 25 is a characteristic diagram of the duty-ratio deciding means of the embodiments 5 to 8 of the invention.

The operation at that time is shown in FIG. 24. In the figure, a duty ratio decision means 140 decides a duty ratio D from the motor rotational speed Ns detected from the motor rotational speed detection means 7. A motor short-circuit means 141 PWM-drives transistors 3a and 3b with the duty ratio D decided by the duty ratio decision means 140 and turns off transistors 3c and 3d to short-circuit both ends of the motor with the duty ratio D. Now, if the duty ratio decision means 140 has a characteristic such as that shown in FIG. 25, the duty ratio will become zero when the motor rotational speed Ns is less than a predetermined value N1 (for example, 500 rpm), and the transistors 3a to 3d are turned off. When the motor rotational speed Ns is more than the predetermined value N1, the transistors 3a and 3b are PWM-driven with a predetermined duty ratio D1 and the transistors 3c and 3d are turned off. Therefore, a regenerative current can flow through the transistors 3a and 3b.

As described above, if the steering torque during steering becomes more than a predetermined value $T_1$, the steering force can be reduced by the power assisting control. Also, if the steering torque becomes less than the predetermined value T1 when the steering wheel is automatically returned with the drives hands free from the steering wheel, the motor 1 will be operated under the restraint control so that the motor rotational speed does not exceed the predetermined value N1. As a result, the steering wheel return speed is restrained. Also, when the steering wheel returns to the straight travel state after it has been steered to the right or left during high-speed travel, the steering wheel return speed is restrained even if the reaction force from the road surface is great. Therefore, overshooting during returning becomes smaller and the convergence and control stability of the steering wheel is improved.

Figure 26:
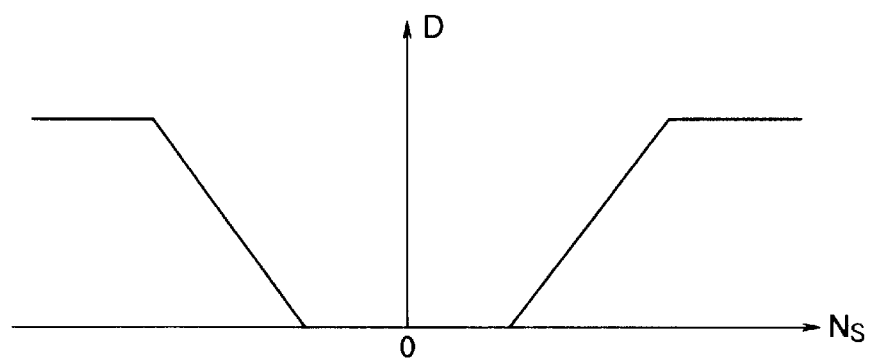
FIG. 26 is a characteristic diagram of the duty-ratio deciding means of the embodiment 5 of the invention.

Also, if the duty ratio decision means 140 has a characteristic such that the duty ratio D gradually increases according to the rotational speed of the motor, as shown in FIG. 26, the steering wheel return speed can be reduced to less than a certain value by restraining the motor rotational speed according to the steering wheel return speed.

While in this embodiment, the transistors 3a and 3b have been PWM-driven and the transistors 3c and 3d have been turned off, the same effect could be obtained even if the transistors 3a and 3b were turned off and the transistors 3c and 3d were PWM-driven.

Embodiment 6

Figure 22:
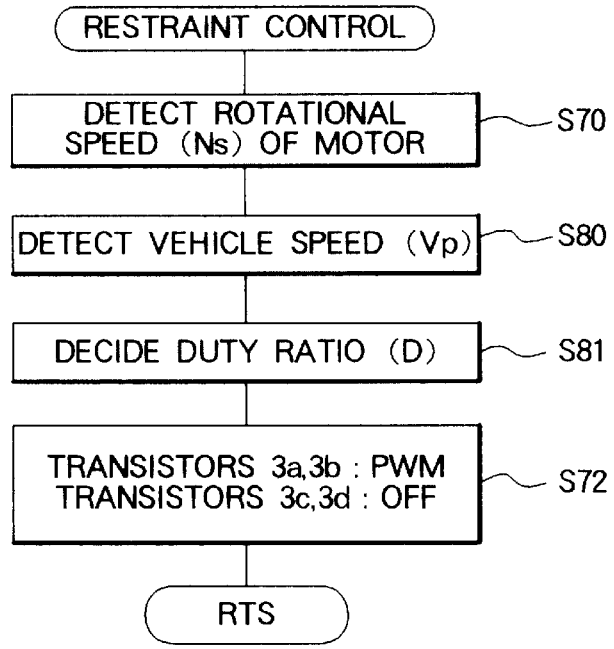
FIG. 22 is a flow chart of the restraint control of the embodiment 6 of the invention.

A sixth embodiment of this invention will hereinafter be described. The circuit diagram, flow chart of the main program, and flow chart of the power assisting control of this embodiment are identical with those of FIGS. 1, 4, and 5 of the above-described embodiment 1. FIG. 22 is a flow chart showing the restraint control of this embodiment. In the figure, first, in step S70 a motor rotational speed Ns is detected from the motor rotational-speed detection means 7. In step S80 a vehicle speed Vp is detected from the vehicle speed sensor 9. In step S81 a duty ratio D corresponding to the motor rotational speed Ns and the speed Vp is decided. In step S72, transistors 3a and 3b are PWM-driven with the duty ratio decided in the step S81, and transistors 3c and 3d are turned off.

Figure 27:
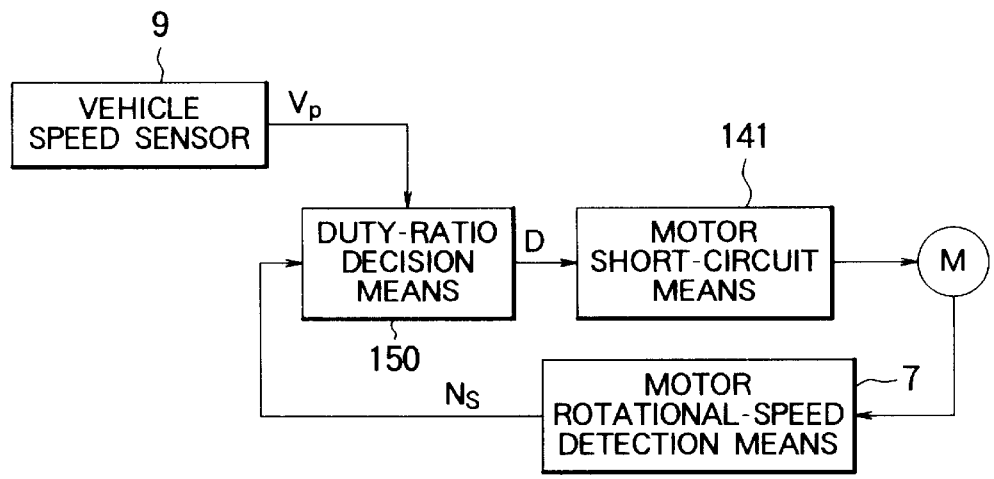
FIG. 27 is a block diagram of the restraint control of the embodiments 6 and 8 of the invention.

The operation at that time is shown in FIG. 27. In the figure, a duty ratio decision means 150 decides a duty ratio D from the motor rotational speed Ns and the vehicle speed Vp. A motor short-circuit means 141 PWM-drives transistors 3a and 3b with the duty ratio D decided by the duty ratio decision means 150 and turns off transistors 3c and 3d. Now, if the duty ratio decision means 150 has a characteristic such as that shown in FIG. 25 and, further, the duty ratio D1 and motor rotational speed N1 of FIG. 25 have characteristics which change according to the vehicle speed Vp as in FIGS. 28 and 29, the motor 1 will be short-circuited with the PWM drive based on the duty ratio D decided by the motor rotational speed Ns and the vehicle speed Vp.

Figure 28:
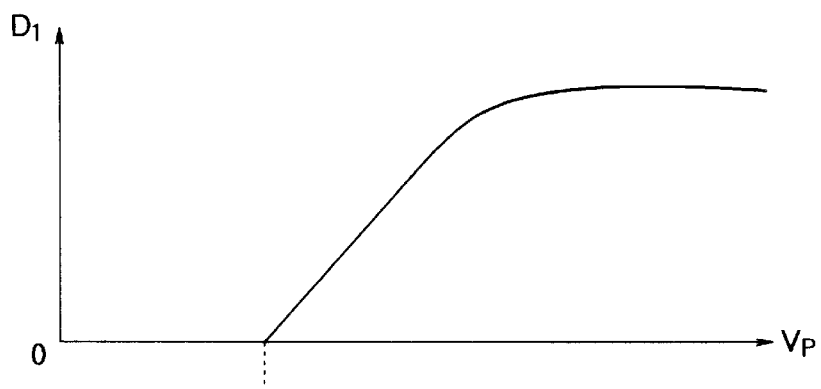
FIG. 28 is a characteristic diagram of the duty-ratio deciding means of the embodiments 6 and 8 of the invention.
Figure 29:
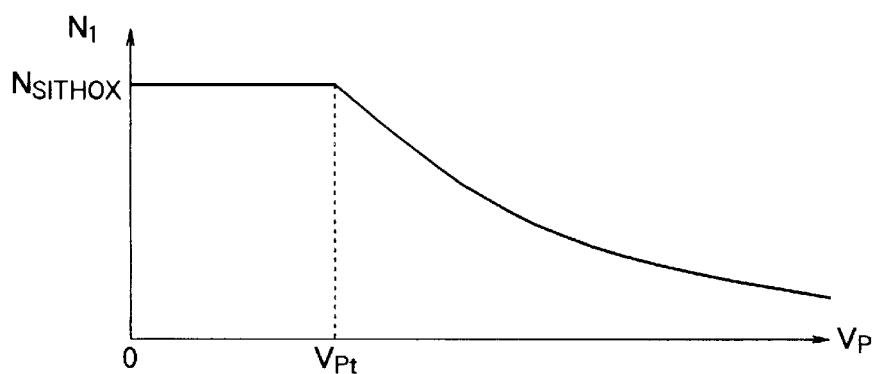
FIG. 29 is a characteristic diagram of the duty-ratio deciding means of the embodiments 6 and 8 of the invention.

Also, in FIG. 28, when the speed Vp is less than Vpt (for example, 30 km/h), the duty ratio D1 is set to 0. In FIG. 29, when the speed Vp is less than Vpt, the predetermined value N1 is set to a value greater than the maximum value NSmax of the detected value of the motor rotational-speed detection means 7. Therefore, when the vehicle speed Vp is less than Vpt, the motor rotational speed is not restrained.

As described above, if the steering torque during steering becomes more than a predetermined value T1, so the steering force as required of the driver can be reduced by the power assisting control. Also, if the steering torque becomes less than the predetermined value T1 when the steering wheel is automatically returned with the driver's hands free from the steering wheel, the motor will be operated under the restraint control so that the motor rotational speed does not exceed the predetermined value N1. As a result, the steering wheel return speed is restrained. Also, when the steering wheel returns to the straight travel state after it has been steered to the right or left during high-speed travel, the steering wheel return speed is restrained even if the reaction force from the road surface is great. Therefore, overshooting during returning becomes smaller and the convergence and control stability of the steering wheel is improved.

Further, as shown in FIGS. 28 and 29, a duty ratio D1 that short-circuits both ends of the motor, and the predetermined value N1 are changed according to the vehicle speed Vp. Therefore, since the steering wheel return speed is restrained during high-speed travel in which a reaction force from the road surface becomes greater, and the steering wheel return speed is not restrained during low-speed travel (less than 30 km/h, for example) in which a reaction force from the road surface becomes smaller, the convergence and control stability of the steering wheel during high-speed travel can be improved without reducing the steering wheel return speed during low-speed travel. In addition, there is no need for the drive, to return the steering wheel to the neutral position even during low-speed travel, so the burden to the driver is reduced.

While in this embodiment, the transistors 3a and 3b have been PWM-driven and the transistors 3c and 3d have been turned off, the same effect could be obtained even if the transistors 3a and 3b were turned off and the transistors 3c and 3d were PWM-driven.

Embodiment 7

Figure 23:
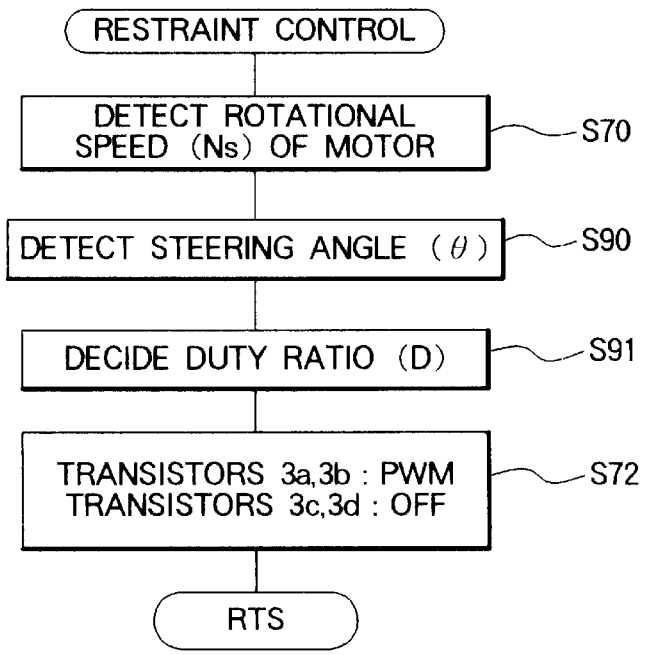
FIG. 23 is a flow chart of the restraint control of the embodiment 7 of the invention.

A seventh embodiment of this invention will hereinafter be described. The circuit diagram, flow chart of the main program, and flow chart of the power assisting control of this embodiment are identical with FIGS. 2, 4, and 5 of the above-described embodiment 3. FIG. 23 is a flow chart showing the restraint control of this embodiment. In the figure, first, in step S70 a motor rotational speed Ns is detected from a motor rotational-speed detection means 7. In step S90 a steering angle is detected from a steering-angle detection means 11. In step S91 a duty ratio D corresponding to the motor rotational speed Ns and the steering angle is decided. In step S72, transistors 3a and 3b are PWM-driven with the duty ratio D decided in the step S91, and transistors 3c and 3d are turned off.

Figure 30:
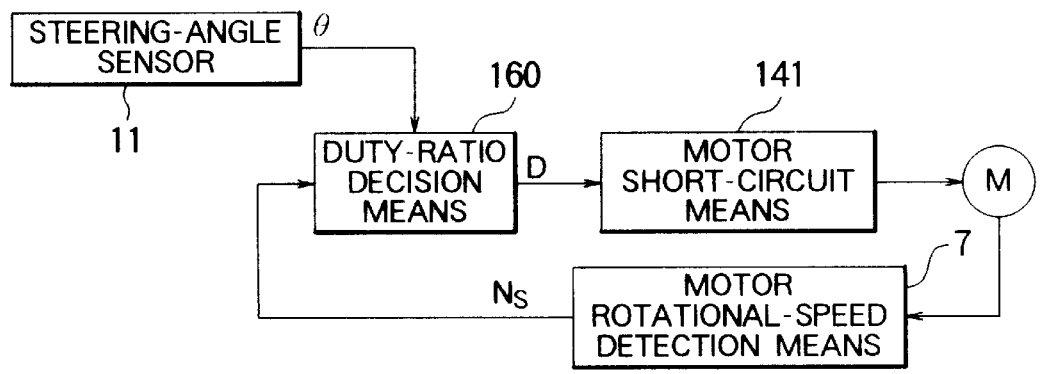
FIG. 30 is a block diagram of the restraint control of the embodiment 7 of the invention.

The operation at that time is shown in FIG. 30. In the figure, a duty ratio decision means 160 decides a duty ratio D from the motor rotational speed Ns and the steering angle. A motor short-circuit means 141 PWM-drives the transistors 3a and 3b with the duty ratio D decided by the duty ratio decision means 160 and turns off the transistors 3c and 3d. Now, if the duty ratio decision means 160 has a characteristic such as that shown in FIG. 25 and, further, the duty ratio D1 and motor rotational speed N1 in FIG. 25 have characteristics which change according to the steering angle as in FIGS. 31 and 32, the motor 1 will be short-circuited with the PWM drive based on the duty ratio D decided by the motor rotational speed Ns and the steering angle.

As described above, if the steering torque during steering becomes more than a predetermined value T1, the steering force can be reduced by the power assisting control. Also, if the steering torque becomes less than the predetermined value T1 when the steering wheel is automatically returned with the driver's hands free from the steering wheel, the motor will be operated under the restraint control so that the motor rotational speed does not exceed the predetermined value N1. As a result, the steering wheel return speed is restrained. Also, when the steering wheel returns to the straight travel state after it has been steered to the right or left during high-speed travel, the steering wheel return speed is restrained even if the reaction force from the road surface is great Therefore, overshooting during returning becomes smaller and the convergence and control stability of the steering wheel is improved.

Figure 31:
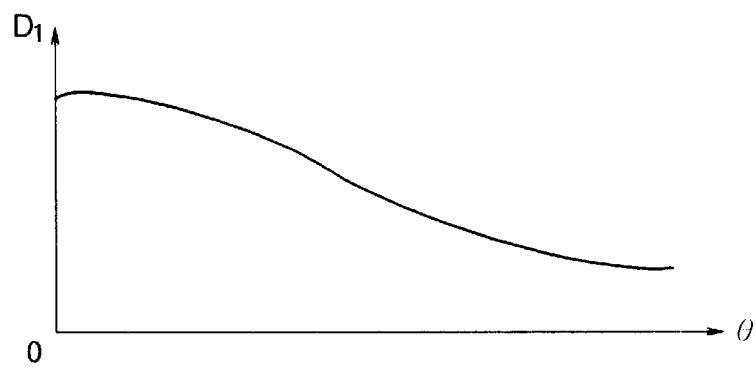
FIG. 31 is a characteristic diagram of the duty-ratio deciding means of the embodiment 7 of the invention.
Figure 32:
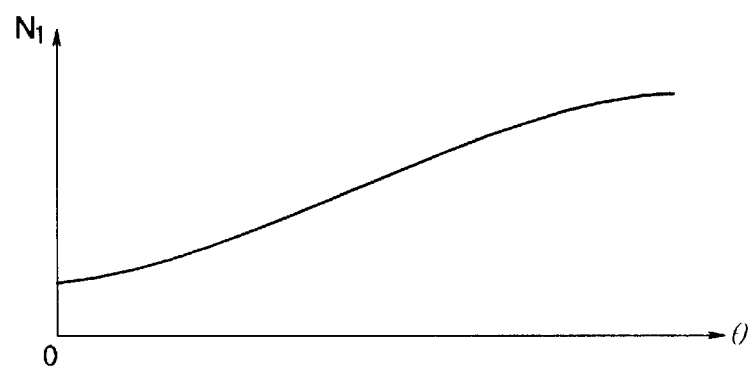
FIG. 32 is a characteristic diagram of the duty-ratio deciding means of the embodiment 7 of the invention.

Further, as shown in FIGS. 31 and 32, the duty ratio D1 that short-circuits both ends of the motor, and the predetermined value N1 are changed according to the steering angle. Therefore, since the restraining force of the steering wheel return speed becomes smaller as the steering angle increases so that the restraining force of the steering wheel return speed is the greatest when the steering wheel is near the neutral position thereof, the convergence and control stability of the steering wheel is improved without reducing the steering wheel return speed as the steering wheel is steered to a great extent. Therefore, after the steering wheel has been greatly steered, there is no need for the driver to positively return the steering wheel to the neutral position, so the burden to the driver is reduced.

While in this embodiment, the transistors 3a and 3b have been PWM-driven and the transistors 3c and 3d have been turned off, the same effect could be obtained even if the transistors 3a and 3b were turned off and the transistors 3c and 3d were PWM-driven.

Embodiment 8

Figure 33:
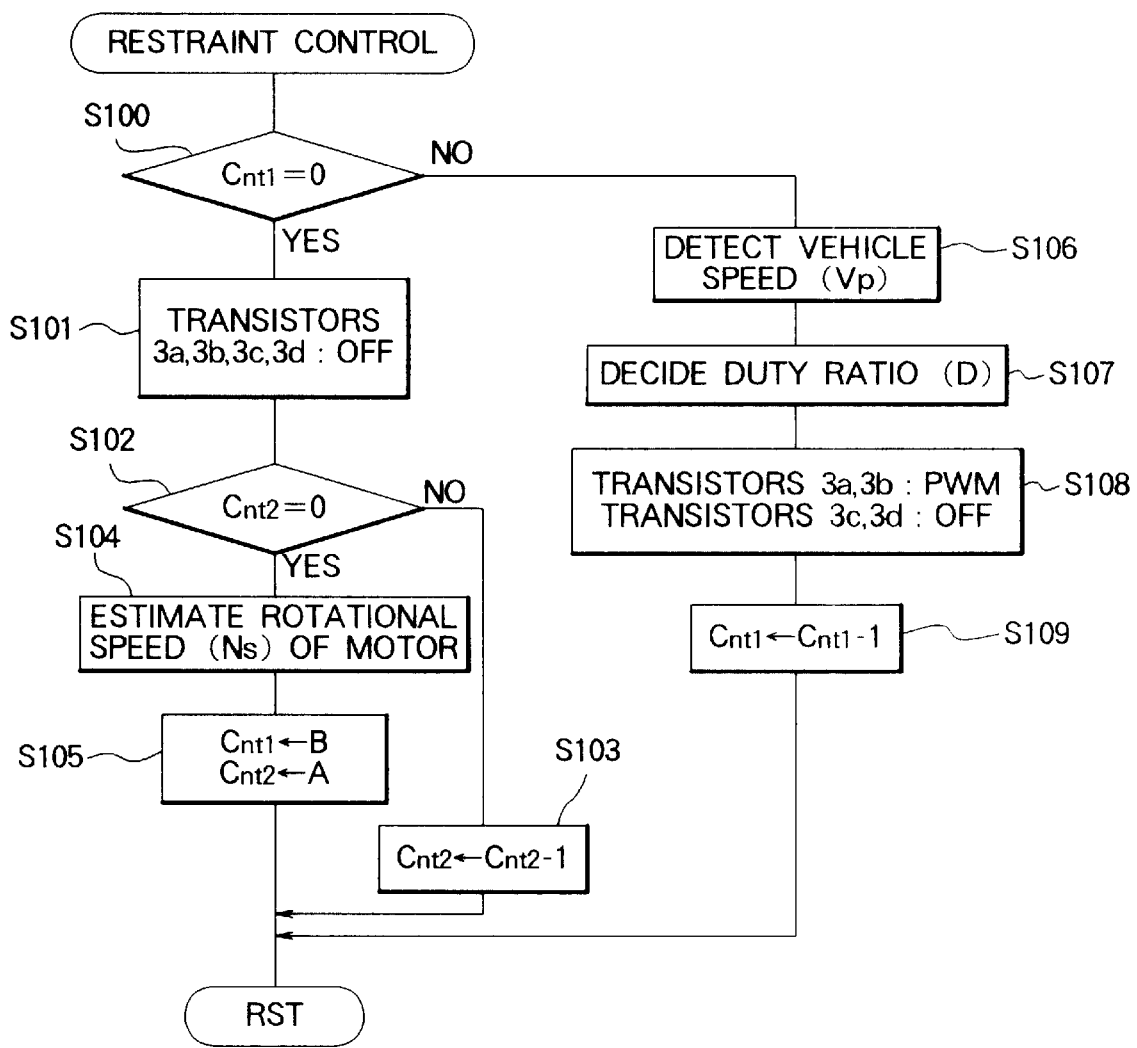
FIG. 33 is a flow chart of the restraint control of the embodiment 8 of the invention.
Figure 34:
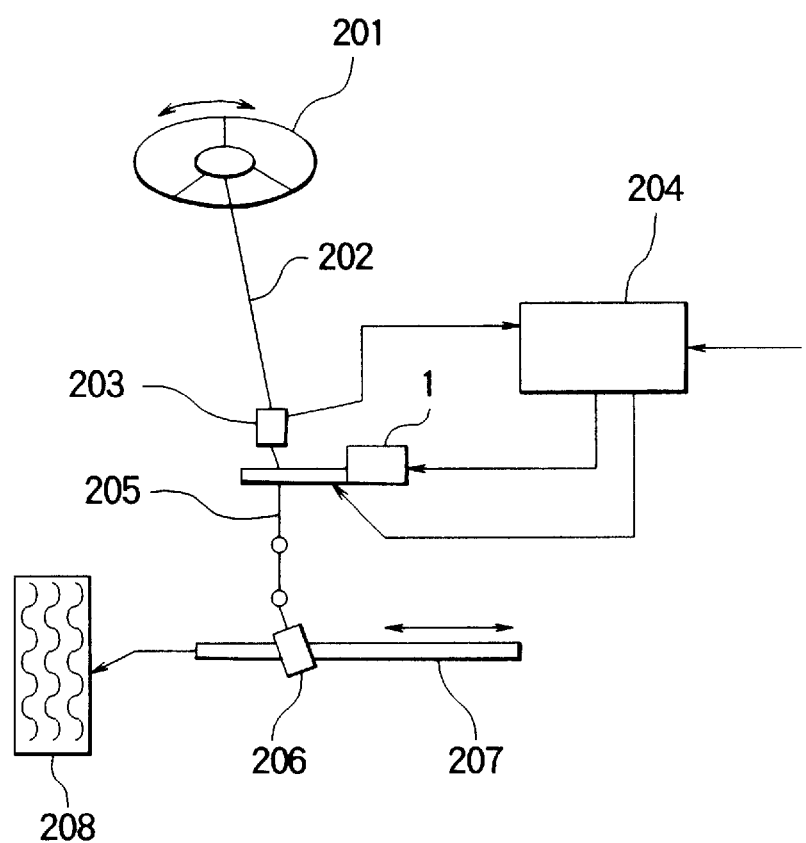
FIG. 34 is a schematic view of a conventional electric power steering control apparatus.
Figure 35:
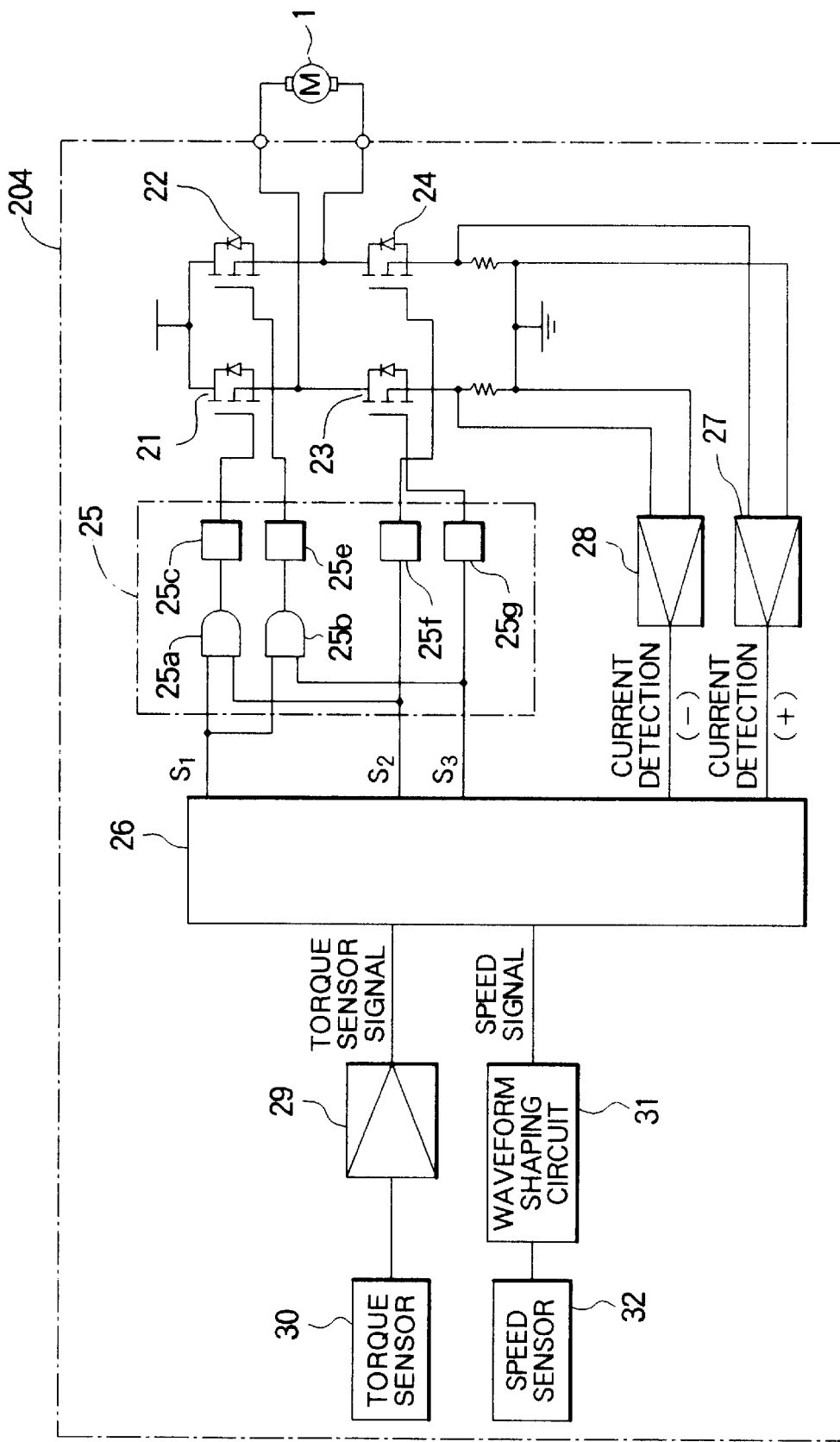
FIG. 35 is a circuit diagram of the control unit of the apparatus of FIG. 34.

An eighth embodiment of this invention will hereinafter be described. The circuit diagram, flow chart of the main program, and flow chart of the power assisting control of this embodiment are identical with those in FIGS. 3, 18 and 5 of the above-described embodiment 4. FIG. 33 is a flow chart showing the restraint control of this embodiment. In the figure, it is determined in step S100 whether the counter Cnt1 is zero. Since in the main program the counter Cnt1 has been set to zero, the control process proceeds from step S100 to step S101. In the step S101, transistors 3a to 3d are turned off. In step S102 it is determined whether the counter Cnt2 is zero. Since in the main program a predetermined value A has been substituted or pu: into a counter Cnt2, the control process proceeds from step S102 to step S803. In the step S103 the counter Cnt2 is decremented, and the control process then returns and is repeated until the counter Cnt2 becomes zero. At this time, if the state in which the predetermined value of the steering torque is less then T1 continues, the restraint control will be performed again.

The counter Cnt2 has been initialized to a predetermined value A. Therefore, if the restraint control in the step S4 is continuously executed for a predetermined period of time (for example, 4 msec), the counter Cnt2 will become zero and therefore the process proceeds from step S102 to step S104. In the step S014 a motor rotational speed Ns is estimated from the terminal voltage of the motor 1. At this time, the transistors 3a to 3d are off, so the relationship between the motor terminal voltage and the motor rotational speed goes to a state as shown in FIG. 20. At this time, from the motor terminal voltage, the right-handed rotation of the motor rotational speed can be estimated as a plus value, and the left-handed rotation can be estimated as a minus value. Thereafter, in step S105, predetermined values B and A are substituted into the counters Cnt1 and Cnt2, respectively, and then the restraint control is ended.

Also, if the state in which the absolute value of the steering torque is less than the predetermined value T1 continues, the restraint control will be performed again. Since the counter Cnt1 has been set to the predetermined value B, the control process proceeds from step S100 to step S106. In the step S106, the vehicle speed Vp is detected by the vehicle speed sensor 9. In step S107 there is decided a duty ratio D corresponding to the motor rotational speed Ns estimated in the step S104 and to the speed Vp detected in the step S106. In step S108, the transistors 3a and 3b are PWM-driven with the duty ratio D, and the transistors 3c and 3d are turned off. The duty ratio D at that time is determined as in FIG. 25 by the motor rotational speed Ns. The duty ratio D1 and motor rotational speed N1 of FIG. 25 change according to the vehicle speed Vp as in FIGS. 28 and 29. Therefore, the block diagram of the restraint control becomes identical with that of FIG. 27 of the embodiment 6.

As described above, if the steering torque during steering becomes more than a predetermined value T1, so the steering force as required of the driver can be reduced by the power assisting control. Also, if the steering torque becomes less than the predetermined value T1 when the steering wheel is automatically returned with the driver's hands free from the steering wheel, the motor will be operated under the restraint control so that the motor rotational speed does not exceed the predetermined value N1. As a result, the steering wheel return speed can be restrained. Also, when the steering wheel returns to the straight travel state after it has been steered to the right or left during high-speed travel, the steering wheel return speed is restrained even if a reaction force from the road surface is great. Therefore, overshooting during returning becomes smaller and the convergence and control stability of the steering wheel if improved.

Further, as shown in FIGS. 28 and 29, the duty ratio D1 that short-circuits both ends of the motor, and the predetermined value N1 are changed according to the vehicle speed Vp. Therefore, since the steering wheel return speed is restrained during high-speed travel in which a reaction force from the road surface becomes greater, and the steering wheel return speed is not restrained during low-speed travel (less than 30 km/h, for example) in which a reaction force from the road surface becomes smaller, the convergence and control stability of the steering wheel during high-speed travel is improved without reducing the steering wheel return speed during low-speed travel. With this, there is no need for the driver to return the steering wheel to the neutral position even during low-speed travel, so the burden to the driver is reduced. In addition, since the rotational speed of the motor is estimated from the motor terminal voltage, and the restraint control and the estimation of the motor rotational speed are alternately performed, the apparatus can be constituted with inexpensive circuits without adding a special sensor.

While in this embodiment, the transistors 3a and 3b have been PWM-driven and the transistors 3c and 3d have been turned off, the same effect could be obtained even if the transistors 3a and 3b were turned off and the transistors 3c and 3d were PWM-driven.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. An electric power steering control apparatus comprising:

a steering torque sensor for detecting a steering torque of a steering system of a vehicle and generating a corresponding output signal;

a D.C. motor having a pair of terminals for generating a power assisting force to reduce a steering force of a driver of the vehicle required to be imparted to said steering system;

motor drive means for driving said electric motor in a direction of reducing said driver's steering force according to at least the output signal of said steering torque sensor;

motor rotational-speed estimating means for estimating the rotational speed of said motor from an electromotive force generated when the terminals of said D.C. motor are opened; and control means for alternatively operating said motor drive means to drive said motor and said motor rotational-speed estimating means to estimate the motor-rotational speed when said steering torque is less than a predetermined torque value, so that said estimated rotational speed of said motor does not exceed a predetermined speed value.

2. An electric power steering control apparatus comprising:

a steering torque sensor for detecting a steering torque of a steering system of a vehicle and generating a corresponding output signal;

a vehicle speed sensor for detecting a speed of the vehicle and generating a corresponding output signal;

a D.C. motor having a pair of terminals for generating a power assisting force to reduce a steering force of a driver of the vehicle required to be imparted to said steering system;

motor drive means for driving said electric motor in a direction of reducing said steering force according to at least the output signal of said steering torque sensor;

motor rotational-speed detection means for detecting a rotational speed of said electric motor and generating a corresponding output signal;

motor rotational-direction detection means for detecting a direction of rotation of said electric motor; and drive-quantity control means for determining a quantity of drive of said motor from at least one of the vehicle speed and the motor rotational speed, drive-quantity control means being operable to drive said electric motor in a direction opposite to said direction of rotation thereof detected by said motor rotational-direction detection means by said quantity of drive when said steering torque is less than a predetermined value.

3. An electric power steering control apparatus comprising:

a steering torque sensor for detecting a steering torque of a steering system of a vehicle and generating a corresponding output signal;

a vehicle speed sensor for detecting a speed of the vehicle and generating a corresponding output signal;

a D.C. motor having a pair of terminals for generating a power assisting force to reduce a steering force of a driver of the vehicle required to impart to said steering system;

motor drive means for driving said electric motor in a direction of reducing said driver's steering force according to at least the output signal of said steering torque sensor;

motor rotational-speed estimating means for estimating the rotational speed of said motor from an electromotive force generated when the terminals of said D.C. motor are opened;

motor rotational-direction estimating means for estimating the rotational direction of said motor from an electromotive force generated when the terminals of said D.C. motor are opened; and control means for alternatively operating said motor drive means to drive said motor and said motor rotational-speed estimating means to estimate the motor rotational speed and determining a quantity of drive of said motor from at least one of the vehicle speed and the estimated motor rotational speed when said steering torque is less than a predetermined value, so that motor is thereby driven to rotate in a direction opposite to said direction of rotation thereof detected by said motor rotational-direction detection means by said quantity of drive.

4. An electric power steering control apparatus comprising:

a steering torque sensor for detecting a steering torque of a steering system of a vehicle and generating a corresponding output signal;

a vehicle speed sensor for detecting a speed of the vehicle and generating a corresponding output signal;

a D.C. motor having a pair of terminals for generating a power assisting force to reduce a steering force of a driver of the vehicle required to impart to said steering system;

motor drive means for driving said electric motor in a direction of reducing said driver's steering force according to at least the output signal of said steering torque sensor;

motor rotational-speed estimating means for estimating the rotational speed of said motor from an electromotive force generated when the terminals of said D.C. motor are opened;

duty-ratio decision means for deciding a duty ratio from at least one of the output signals of said motor rotational-speed estimating means and said vehicle speed sensor when said steering torque is less than a predetermined value; and control means for short-circuiting said motor according to a PWM signal of said duty ratio decided by said duty-ratio decision means, said control means being operable to alternatively perform short-circuiting of said motor and operate said motor rotational-speed estimating means to estimate said motor-rotational speed.

* * * * *